(12) United States Patent
Zeng et al.

(10) Patent No.: US 8,307,127 B1
(45) Date of Patent: Nov. 6, 2012

(54) DEVICE LIVE SUSPEND AND RESUME

(75) Inventors: Jason Zeng, Beijing (CN); Colin Zou, Beijing (CN); Wesley Shao, Union City, CA (US)

(73) Assignee: Oracle International Corporation, Redwood City, CA (US)

(*) Notice: Subject to any disclaimer, the term of this patent is extended or adjusted under 35 U.S.C. 154(b) by 0 days.

(21) Appl. No.: 13/176,888

(22) Filed: Jul. 6, 2011

(51) Int. Cl.
*G06F 3/00* (2006.01)
*G06F 3/01* (2006.01)
(52) U.S. Cl. ............................................. 710/7; 710/22
(58) Field of Classification Search .................. 710/7, 22
See application file for complete search history.

(56) References Cited

U.S. PATENT DOCUMENTS 5,560,022 A * 9/1996 Dunstan et al. ............... 713/300

OTHER PUBLICATIONS

Ravi Budruk, Don Anderson and Tom Shanley, "PCI Express System Architecture" Mindshare Inc., Sep. 14, 2003 (pp. 55-102).

* cited by examiner

*Primary Examiner* — Hyun Nam
(74) *Attorney, Agent, or Firm* — Osha Liang LLP

(57) ABSTRACT

A method comprising: sending an I/O message to an I/O device on an I/O bus, wherein the I/O device comprises an I/O device state, wherein the first I/O message is a I/O traffic type; receiving a LSR suspend request comprising a suspend instruction to suspend the I/O traffic type, an expected impact, and an I/O device identifier associated with the I/O device; setting the I/O device state to suspended in response to the receiving the LSR suspend request, wherein no I/O messages of the I/O traffic type are sent to the I/O device while the I/O device state is suspended; receiving a LSR resume request comprising a resume instruction to resume the I/O traffic type, the expected impact, and the I/O device identifier; setting the I/O device state to online in response to the receiving the LSR resume request; and sending a second I/O message to the I/O device.

17 Claims, 18 Drawing Sheets

DEVICE LIVE SUSPEND AND RESUME

BACKGROUND

Modern computer systems use input/output (I/O) buses to connect I/O devices to other system elements. Larger computer systems may have a great many I/O devices connected to the system using multiple I/O buses. I/O devices frequently require maintenance, resetting, or replacement, and these activities may require a shutdown of all or part of the computer system. For computer systems that are relied upon for business needs, extended periods of downtime can cause greatly reduced business efficiency. Therefore, limiting the downtime necessary to maintain I/O devices connected to a computer system may also result in a more limited impact to business efficiency.

SUMMARY

In general, in one aspect, the invention relates to a non-transitory computer readable medium comprising instructions, which when executed by a processor perform a method, the method comprising: sending a first input/output (I/O) message to an I/O device on an I/O bus, wherein the I/O device comprises an I/O device state, wherein the first I/O message is a first I/O traffic type; receiving, from a live suspend and resume (LSR) module, a first LSR suspend request comprising a first suspend instruction to suspend the first I/O traffic type, a first expected impact, and an I/O device identifier associated with the I/O device; setting the I/O device state to suspended in response to the receiving the first LSR suspend request, wherein no I/O messages of the first I/O traffic type are sent to the I/O device while the I/O device state is suspended; receiving, from the LSR module, a first LSR resume request comprising a first resume instruction to resume the first I/O traffic type, the first expected impact, and the I/O device identifier; setting the I/O device state to online in response to the receiving the first LSR resume request; and sending a second I/O message to the I/O device, wherein the second I/O message is the first I/O traffic type.

In general, in one aspect, the invention relates to a non-transitory computer readable medium comprising instructions, which when executed by a processor perform a method, the method comprising: receiving a first input/output (I/O) resume request comprising a first resume instruction to resume a first I/O traffic type, a first expected impact, and a first I/O device identifier associated with a first I/O device, wherein the first I/O device comprises a first I/O device state; making a first determination that the first I/O device state is suspended, wherein no I/O messages of the first I/O traffic type are sent to the first I/O device while the first I/O device state is suspended; obtaining a first live suspend and resume (LSR) suspend request from a first device driver associated with the first I/O device; making a second determination, using the first LSR suspend request and the first I/O resume request, that the first I/O traffic type may be resumed; converting, in response to the second determination, the first I/O resume request into a first LSR resume request; and sending the first LSR resume request to the first device driver.

In general, in one aspect, the invention relates to a system comprising: an input/output (I/O) bus; an I/O device comprising an I/O device state, wherein the I/O device is operatively connected to the I/O bus; a host, operatively connected to the I/O bus, comprising: a device driver configured to: send a first I/O message to the I/O device using the I/O bus, wherein the first I/O message is associated with an I/O traffic type; receive a live suspend and resume (LSR) suspend request comprising a suspend instruction to suspend the I/O traffic type, an expected impact, and an I/O device identifier associated with the I/O device; set the I/O device state to suspended in response to the receiving the LSR suspend request, wherein no I/O messages of the I/O traffic type are sent to the I/O device while the I/O device state is suspended; receive an LSR resume request; set the I/O device state to online in response to the receiving the LSR resume request; and send a second I/O message to the I/O device, wherein the second I/O message is the I/O traffic type; and the LSR module configured to: receive an I/O resume request comprising a resume instruction to resume the I/O traffic type, the expected impact, and the I/O device identifier; make a first determination that the I/O device state is suspended; obtain the LSR suspend request from the device driver; make a second determination, using the LSR suspend request and the I/O resume request, that the I/O traffic type may be resumed; and convert, in response to the second determination, the I/O resume request into the LSR resume request.

Other aspects of the invention will be apparent from the following description and the appended claims.

DETAILED DESCRIPTION

Figure 1A:
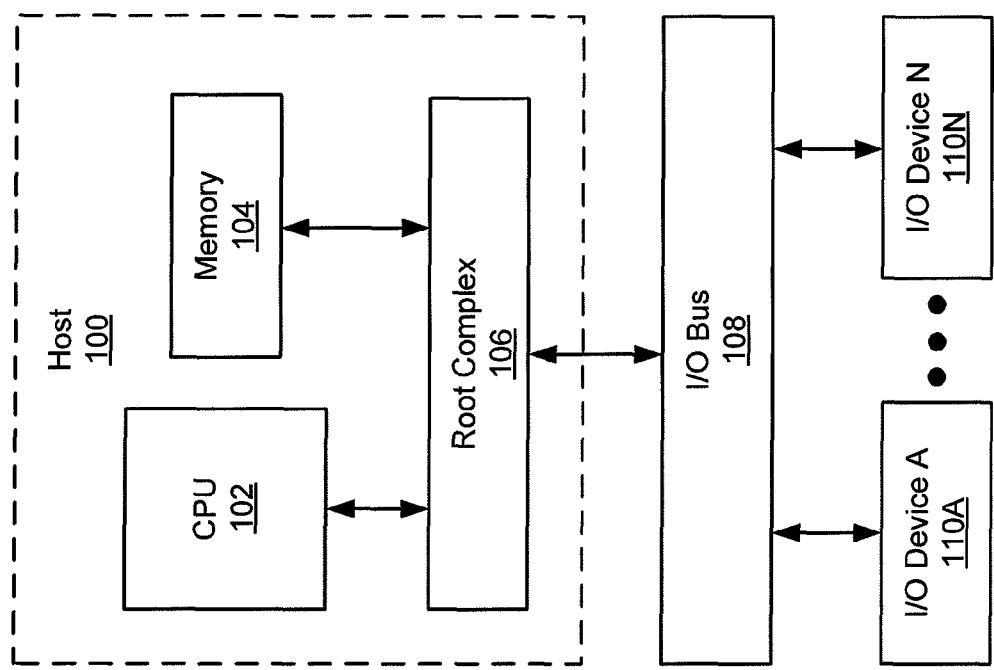
FIGS. 1A-1C show systems in accordance with one or more embodiments of the invention.

Specific embodiments of the invention will now be described in detail with reference to the accompanying figures. Like elements in the various figures are denoted by like reference numerals for consistency.

FIG. 1A shows a system in accordance with one embodiment of the invention. Specifically, FIG. 1A depicts a configuration of hardware components in accordance with one embodiment of the invention. As shown in FIG. 1A, the system includes a conceptual Host (100) that includes a Central Processing Unit (CPU) (102) and a Memory (104). The CPU (102) and Memory (104) are connected by Root Complex (106). The system further includes an input/output (I/O) Bus (108) connected to one or more I/O Devices (I/O Device A (110A), I/O Device N (110N)).

In one embodiment of the invention, the CPU (102) is a hardware processor component for processing instructions of the Host (100). The CPU (102) may include multiple hardware processors. Alternatively or additionally, each hardware processor may include multiple processing cores in one or more embodiments of the invention. In general, the CPU (102) is any device configured to execute instructions on the Host (100). In one or more embodiments of the invention, the Memory (104) is any type of hardware device for storage of data. In one or more embodiments of the invention, the Memory (104) may be used to store instructions and parameters for execution by the CPU (102).

In one or more embodiments of the invention, the Root Complex (106) includes functionality to connect the CPU (102) and Memory (104) to other components on the system via one or more I/O Buses (e.g., I/O Bus (108)). Root Complex (106) may further include functionality to generate transaction requests on behalf of CPU (102). These transaction requests may include memory requests, I/O requests, and locked transaction requests. Further, the Root Complex (106) may include multiple ports to which it may be operatively connected to multiple I/O Buses (e.g., FIG. 1C, infra, I/O Bus A (108A), I/O Bus N (108N)).

In one or more embodiments of the invention, the Root Complex (106) sends transaction requests to I/O Devices (I/O Device A (110A), I/O Device N (110N)) using the I/O Bus (108). In one embodiment of the invention, the I/O Bus (108) is used by the host as a communication channel that interconnects multiple I/O peripheral communication devices, such as I/O Device A (110A) and I/O Device N (110N). In one embodiment of the invention, the I/O Bus (108) includes a Bus Controller (not shown). In one embodiment of the invention, the I/O Bus (108) is implemented as a Peripheral Component Interconnect (PCI) Express™ switch fabric (PCI Express™ is a trademark of the PCI SIG).

In one embodiment of the invention, the I/O Devices (I/O Device A (110A), I/O Device N (110N)) refer to resources connected to the I/O Bus (106), which may be used by programs executing on the system for information input and/or information output. Examples of such devices may include, but are not limited to, disk drives, network interface cards, printers, etc. Further, I/O Devices (I/O Device A (110A), I/O Device N (110N)) may also include other I/O Buses (e.g., I/O Bus (108), Universal Serial Bus (USB), IEEE 1394, Small Computer System Interface (SCSI), etc.). One of ordinary skill in the art will appreciate there are other I/O devices not listed here.

Figure 1B:
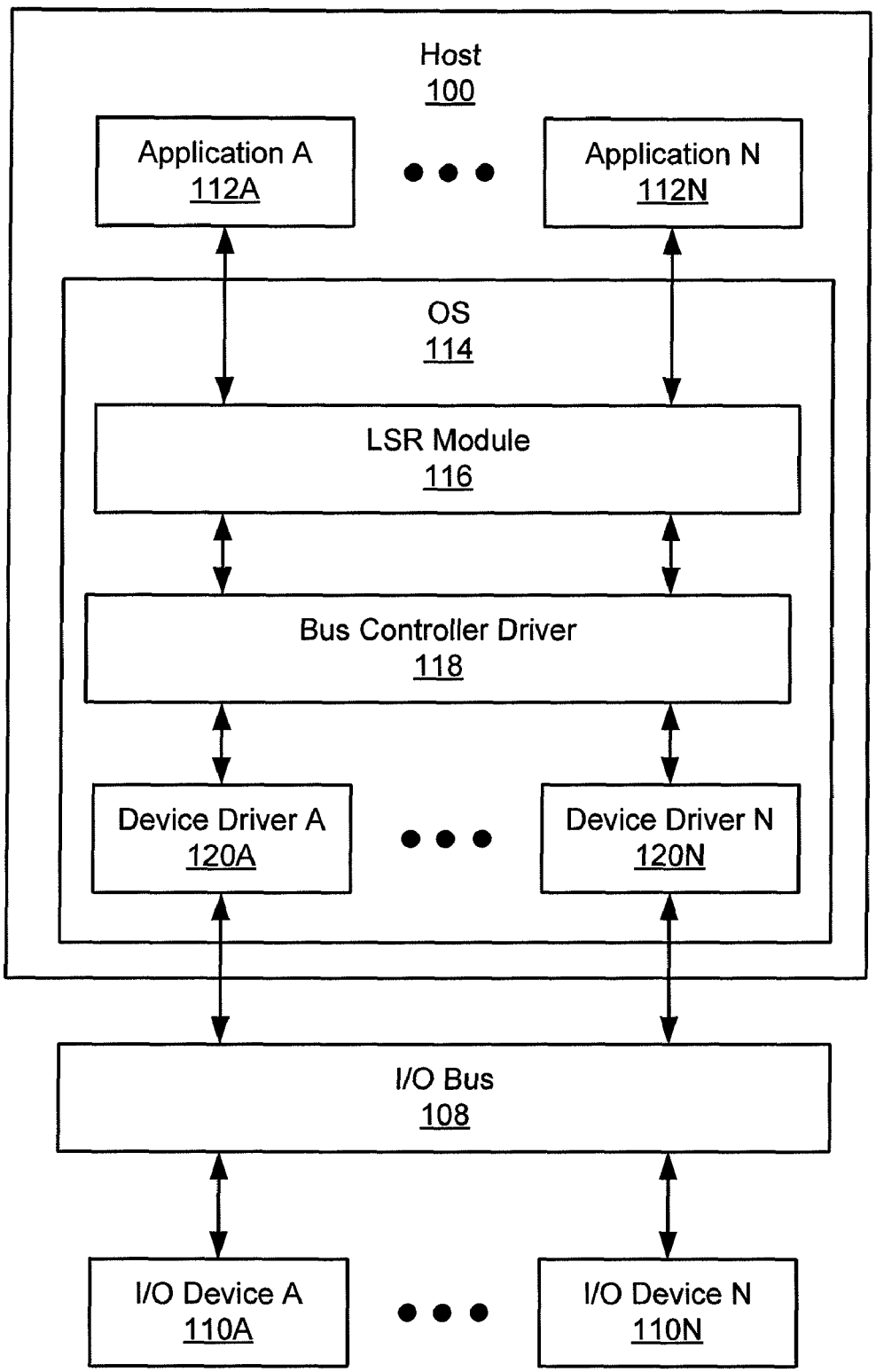

FIG. 1B shows a system in accordance with one embodiment of the invention. Specifically, FIG. 1B depicts a configuration of software and hardware components in accordance with one embodiment of the invention. As shown in FIG. 1B, the Host (100) includes one or more Applications (Application A (112A), Application N (112N)) and an Operating System OS (114). The OS (114) includes a Live Suspend and Resume (LSR) Module (116), a Bus Controller Driver (118), and one or more Device Drivers (Device Driver A (120A), Device Driver N (120N)). The host is operatively connected to an I/O Bus (108) that includes one or more I/O Devices (I/O Device A (110A), I/O Device N (110N)).

In one embodiment of the invention, the OS (114) is software that includes programs and data designed to manage computer resources. In one embodiment of the invention, the OS (114) exposes computer resources for use by the Applications (Application A (112A), Application N (112N)) executing on the OS (114). In one embodiment of the invention, the Applications (Application A (112A), Application N (112N)) are groups of executing software instructions designed to perform a task or related tasks.

In one embodiment of the invention, the Bus Controller Driver (118) is a software program that provides an interface between the OS (114) and the I/O Bus (108). Specifically, the Bus Controller Driver (118) enables the OS (114) to communicate with I/O Devices (I/O Device A (110A), I/O Device N (110N)) attached to the I/O Bus (108). In one embodiment of the invention, the Bus Controller Driver (118) controls communication on the I/O Bus (108) by interacting with an I/O Bus Controller (not shown).

In one embodiment of the invention, the Device Drivers (Device Driver A (120A), Device Driver N (120N)) are software programs that provide an interface between the OS (114) and the I/O Devices (I/O Device A (110A), I/O Device N (110N)) attached to the I/O Bus (108).

In one embodiment of the invention, the OS (114) communicates with I/O Devices (I/O Device A (110A), I/O Device N (110N)) by invoking a routine in the Device Driver (Device Driver A (120A), Device Driver N (120N)). In response, the Device Driver (Device Driver A (120A), Device Driver N (120N)) issues I/O messages to the device via the Device Controller (not shown). The device controller sends the commands to the device. Communication (i.e., I/O messages) between a Device Driver (Device Driver A (120A), Device Driver N (120N)) and its associated I/O Device (I/O Device A (110A), I/O Device N (110N)) may be referred to as the I/O Traffic. I/O Traffic may include direct memory access (DMA) activities, programmed input/output (PIO) activities, or interrupt activities. Accordingly, I/O messages may include a single DMA request, a single PIO request, or an interrupt message.

In one or more embodiments of the invention, which Device Driver (Device Driver A (120A), Device Driver N (120N)) is used is dependent on the I/O Device (I/O Device A (110A), I/O Device N (110N)) and the OS (114). Further, in one or more embodiments of the invention, the Device Driver (Device Driver A (120A), Device Driver N (120N)) is loaded when the operating system is loaded.

In one embodiment of the invention, the LSR Module (116) is a software mechanism for use by the OS (114) and/or Applications (Application A (112A), Application N (112N)) to suspend and resume an I/O Device (I/O Device A (110A), I/O Device N (110N)) (or group of I/O Devices) connected to the system. In one embodiment of the invention, the LSR Module (116) communicates with Bus Controller Driver (118) and Device Driver (Device Driver A (120A), Device Driver N (120N)) (via Bus Controller Driver (118)) to suspend and resume the I/O activities of an I/O Device (I/O Device A (110A), I/O Device N (110N)).

In one embodiment of the invention, Applications (Application A (112A), Application N (112N)) and the OS (114) may send an I/O Suspend Request or I/O Resume Request to the LSR Module (116). In one embodiment of the invention, an I/O Suspend Request includes an identifier for the target I/O Device (Device Driver A (120A), Device Driver N (120N)), a type of I/O Traffic to be suspended, and Expected Impacts. The I/O Traffic types may include, for example, DMA activities, PIO activities, and interrupts. In one embodiment of the invention, the I/O Suspend Request specifies that all I/O Traffic types should be suspended.

In one or more embodiments of the invention, Applications (Application A (112A), Application N (112N)) executing on the OS may include both LSR-aware Applications (Application A (112A), Application N (112N)), as well as LSR-unaware Applications. An LSR-aware Application (Application A (112A), Application N (112N)) may generate an I/O Resume Request to send to the LSR Module (116). Further, an LSR-aware Application may also include functionally to query the LSR Module (116) to determine the state of an I/O Device (I/O Device A (110A), I/O Device N (110N)) (e.g., online, offline, or suspended). LSR-unaware Applications may execute normally without noticing that an I/O Device (Device Driver A (120A), Device Driver N (120N)) is in a suspended state.

In one embodiment of the invention, I/O messages sent to a Device Driver (Device Driver A (120A), Device Driver N (120N)) associated with a suspended I/O Device (I/O Device A (110A), I/O Device N (110N)) may be queued by the Device Driver (Device Driver A (120A), Device Driver N (120N)) until the I/O Traffic to the I/O Device (I/O Device A (110A), I/O Device N (110N)) is resumed. In one embodiment of the invention, I/O messages may be queued by other elements on the system other than the Device Driver (Device Driver A (120A), Device Driver N (120N)). Further, LSR-aware Applications may refrain from sending I/O messages to a currently-suspended I/O Device (I/O Device A (110A), I/O Device N (110N)), and may store the I/O messages until the I/O Device state changes, or inform a user of the Application (Application A (112A), Application N (112N)) that the I/O Device (I/O Device A (110A), I/O Device N (110N)) may not be used currently.

In one or more embodiments of the invention, I/O messages between an Application (Application A (112A), Application N (112N)) and an I/O Device (I/O Device A (110A), I/O Device N (110N)) in an online state are transmitted regardless of the state of other I/O Devices (I/O Device A (110A), I/O Device N (110N)) on the system. For example, if I/O Device A (110A) is suspended with regard to all I/O Traffic, I/O messages between Application A (112A) and Application N (112N) and I/O Device N (110N) are unaffected, assuming I/O Device N (110N) is in a state of online.

In one embodiment of the invention, the Expected Impacts include information about the anticipated changes made to the system while the I/O Device is suspended. The Expected Impacts may include information about a system setting that will require a change to the I/O Device setting. Further, the Expected Impacts may include steps that should be taken by the Bus Controller Driver (118) or Device Driver (Device Driver A (120A), Device Driver N (120N)) to properly deal with the changes to I/O Device (I/O Device A (110A), I/O Device N (110N)) settings.

For example, the Expected Impact for a DMA Address Change may indicate that during the LSR suspension, the I/O Device will undergo DMA address changes. Therefore, the Device Driver should unbind and rebind the DMA buffers. The Expected Impact for a DMA Properties Change may indicate that during the LSR suspension, the platform hardware changes may cause the Device Driver's DMA transaction properties (e.g., the lowest and highest DMA address range, DMA address alignment, DMA segment boundary, etc.) to become invalid Therefore, the Device Driver should re-allocate the DMA handles. The Expected Impact for a Device Reset may indicate that during the LSR suspension, the device will undergo Device Reset. Therefore, the Device Driver must restore device hardware context during the resume. The Expected Impact for a Device Replacement may indicate that during the LSR suspension, the device will be replaced. Therefore, the Device Driver should check the device identity. The Expected Impact for a Loss of Power may indicate that during the LSR suspension, the device will lose power. Therefore, the Device Driver must restore device hardware context during the resume. If necessary, the Device Driver should also reload the Device Driver firmware. Those skilled in the art will appreciate that Expected Impacts are not limited to the above examples.

In one embodiment of the invention, an I/O Resume Request includes an identifier for the target I/O Device (I/O Device A (110A), I/O Device N (110N)), a type of I/O Traffic to be resumed, and the Expected Impacts previously provided in the associated I/O Suspend Request. In one embodiment of the invention the content of the I/O Resume Request is used by the LSR Module (116) to verify that the resume operation is applied to I/O Traffic suspended using previously received Expected Impacts.

In one embodiment of the invention, the LSR Module (116) will interpret and convert the received I/O Suspend Requests and I/O Resume Requests into LSR Suspend Requests and LSR Resume Requests, respectively. In one embodiment of the invention, converting the I/O Suspend Requests and I/O Resume Requests may include altering the I/O Device identifier, I/O Traffic Types, and Expected Impacts such that the information may be understood by the Bus Controller Driver (118) and Device Driver (Device Driver A (120A), Device Driver N (120N)). Further, once received by the Bus Controller Driver (118), the LSR Suspend Requests and LSR Resume Requests may be altered to be properly understood and interpreted by the Device Driver (Device Driver A (120A), Device Driver N (120N)).

Figure 1C:
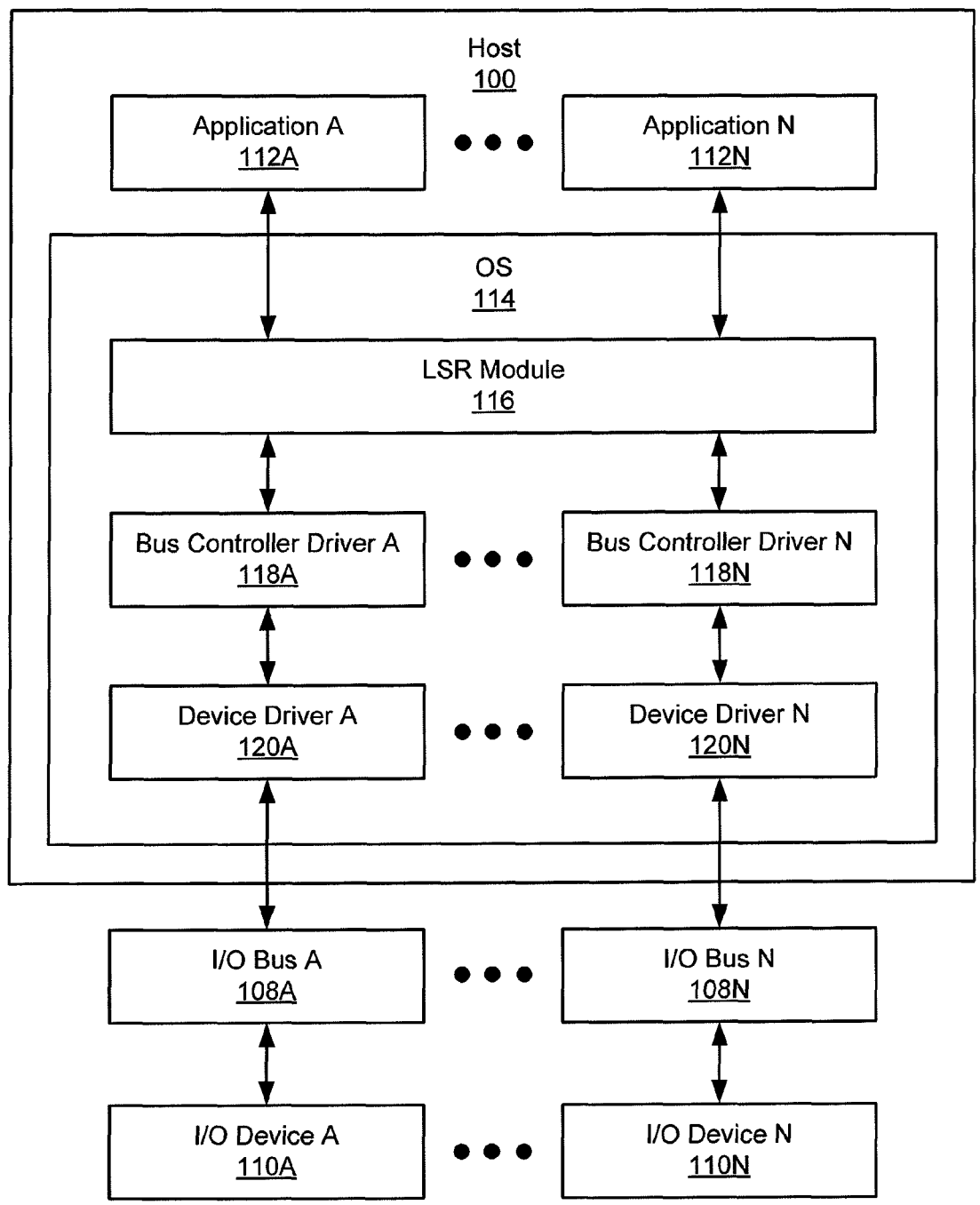

FIG. 1C shows a system in accordance with one embodiment of the invention. Specifically, FIG. 1C depicts a configuration of software and hardware components in accordance with one embodiment of the invention. As shown in FIG. 1C, the Host (100) includes one or more Applications (Application A (112A), Application N (112N)) executing on OS (114).

The OS (114) includes an LSR Module (116), one or more Bus Controller Drivers (Bus Controller Driver A (118A), Bus Controller Driver N (118N)), and one or more Device Drivers (Device Driver A (120A), Device Driver N (120N)). The Host (100) is operatively connected to one or more I/O Buses (I/O Bus A (108A), I/O Bus N (108N)), and each I/O Bus (I/O Bus A (108A), I/O Bus N (108N)) is operatively connected to an I/O Device (I/O Device A (110A), I/O Device N (110N)).

In one embodiment of the invention, each I/O Bus (I/O Bus A (108A), I/O Bus N (108N)) may be connected to more than one Device Driver (Device Driver A (120A), Device Driver N (120N)). Each I/O Bus (I/O Bus A (108A), I/O Bus N (108N)) and associated Device Drivers (Device Driver A (120A), Device Driver N (120N)) may be associated with a different switch fabric connected to the Host (100).

Figure 2:
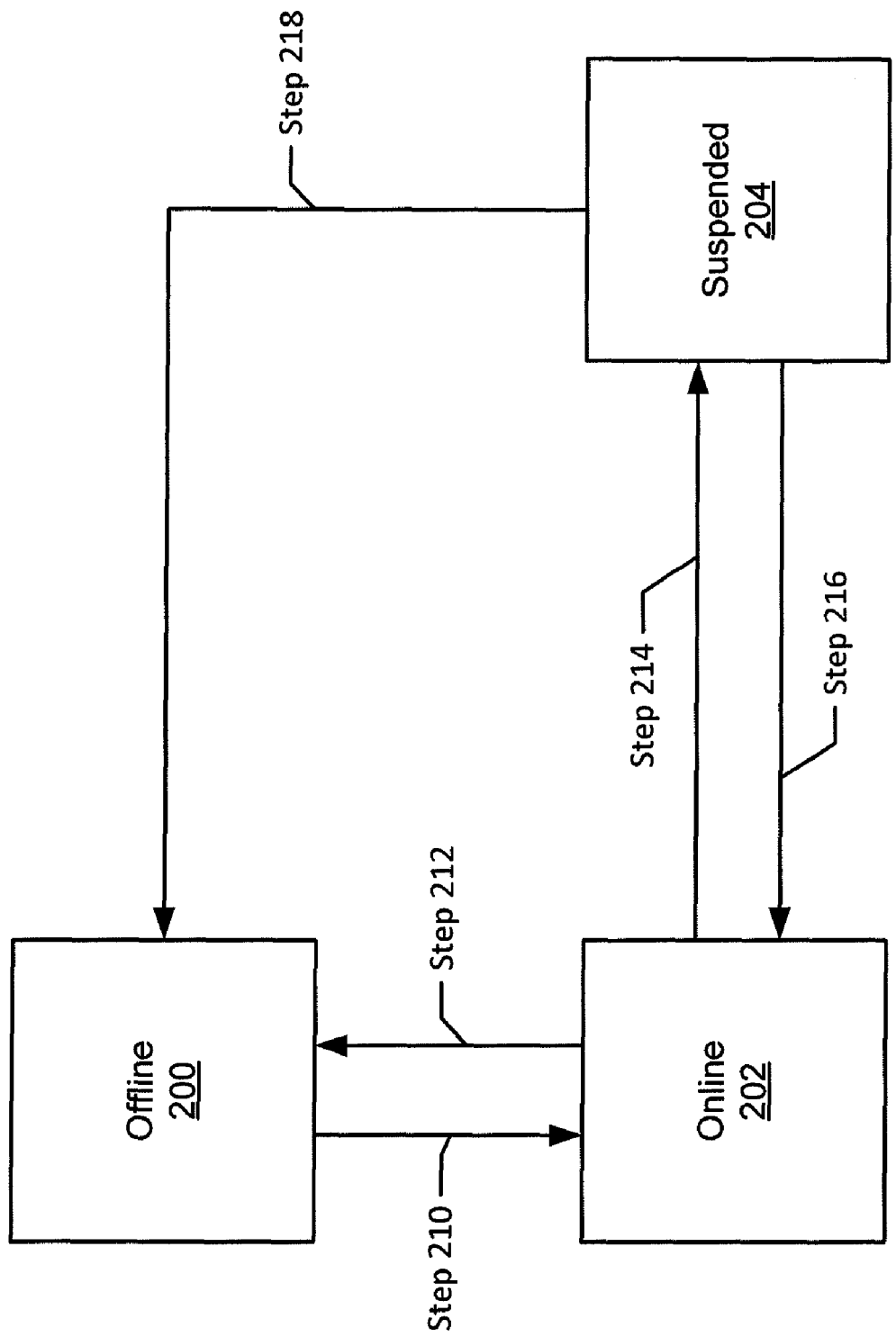
FIG. 2 shows a chart of state transitions in accordance with one or more embodiments of the invention.

FIG. 2 shows a chart of I/O Device state transitions in accordance with one or more embodiments of the invention. Specifically, FIG. 2 shows the states that are induced in the I/O Device by the Device Driver. At Step 210, an I/O Device that is in the Offline (200) state (i.e., disconnected or not functional) is brought into the Online (202) state by the Device Driver. Step 210 may require that the Device Driver establish full functionality to the I/O Device, allowing the host system to utilize the I/O Device functions. Transitioning from the Offline (200) state to the Online (202) state may require that the Device Driver initialize the connection between the host and the I/O Device, and configure and store the I/O Device settings.

At Step 212, an I/O Device that is in the Online (202) state (i.e., fully functional and able to be utilized by the host system) is brought into the Offline (200) state by the Device Driver. Step 212 may indicate that the Device Driver has ceased all activity between the host and the I/O Device, without anticipation that the activity will be restored. Step 212 may be taken by the Device Driver in preparation for removal of the I/O Device from the host system. Step 212 may also be taken if the Device Driver has detected that the I/O Device has become unresponsive, and may no longer be functional. Transitioning from the Online (202) state to the Offline (200) state may require that the Device Driver close the connection between the host and the I/O Device, and remove the I/O Device settings.

At Step 214, an I/O Device that is in the Online (202) state is brought into the Suspended (204) state by the Device Driver. Step 214 may indicate that part or all of the communication between the Device Driver and the I/O Device has been stopped, but the I/O Device is at least partially functional. Transitioning from the Online (202) state to the Suspended (204) state may require that the Device Driver cease part or all of the communication between the host and the I/O Device. Transitioning from the Online (202) state to the Suspended (204) state may further require that the Device Driver store the current I/O Device settings in anticipation that communication between the host and the I/O Device will resume.

At Step 216, an I/O Device that is in the Suspended (204) state is brought into the Online (202) state by the Device Driver. Step 216 may indicate that part or all of the communication between the Device Driver and the I/O Device should be resumed. Transitioning from the Suspended (204) state to the Online (202) state may require that the Device Driver restore I/O Device settings that were previously saved.

At Step 218, an I/O Device that is in the Suspended (204) state is brought into the Offline (200) state by the Device Driver. Step 218 may indicate that a previously suspended I/O Device will not be resumed. Step 218 may further indicate that the previously suspended I/O Device must be reinitialized by the Device Driver before the I/O Device may be transitioned into the Online (202) state.

In one or more embodiments of the invention, while one I/O Device is in a Suspended (204) state, other I/O Devices may continue to operate normally. Further, each I/O Device on the system may be transitioned into or out of any state regardless of the current state of any other I/O Device on the system.

Figure 3:
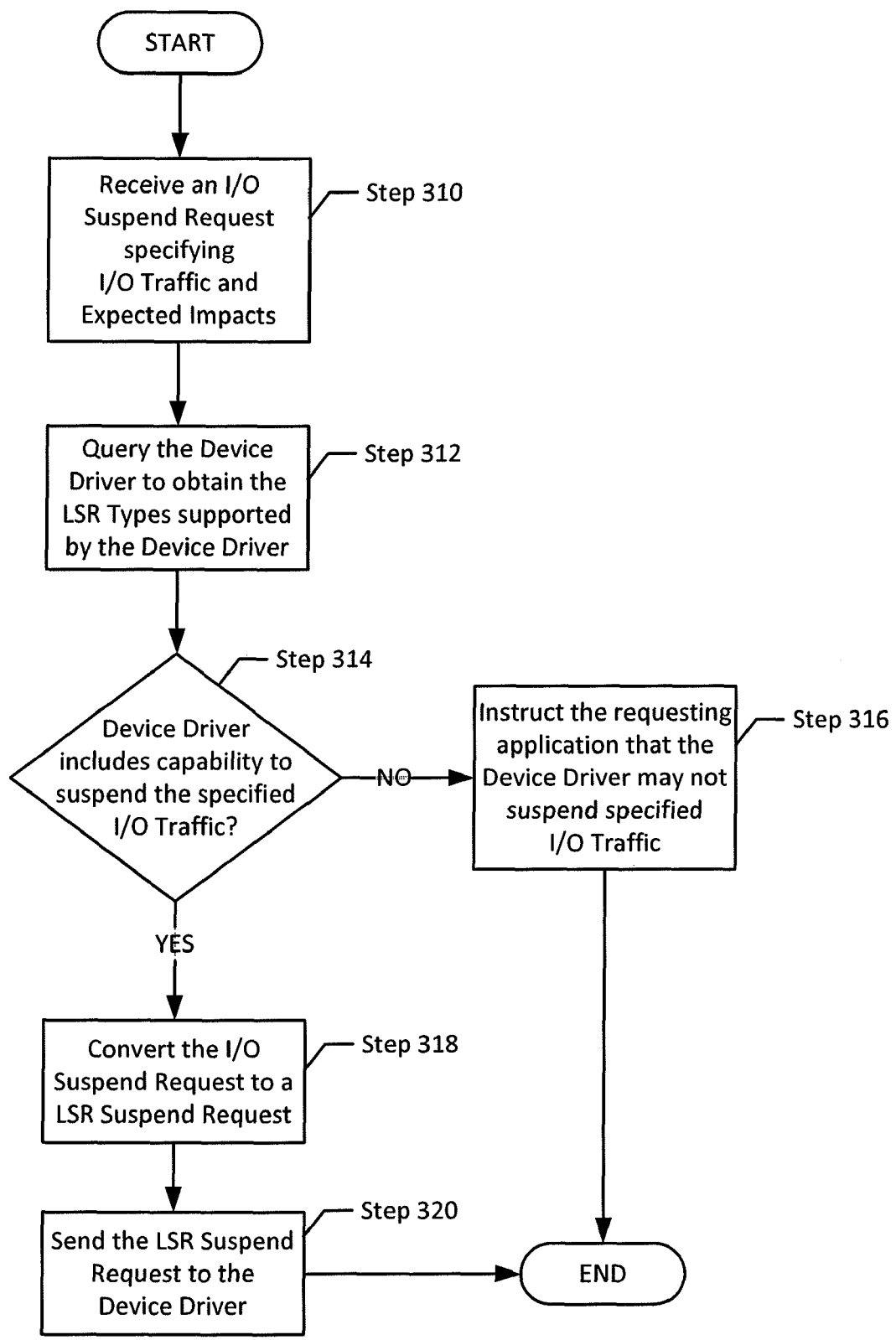
FIGS. 3-6 show flowcharts in one or more embodiments of the invention.

FIG. 3 shows a flowchart of a method for suspending an I/O Device by the LSR Module. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

At Step 310, the LSR Module receives an I/O Suspend Request specifying a type of I/O Traffic to suspend, and the Expected Impacts to the system caused by the suspension. In one embodiment of the invention, the I/O Suspend Request is received from an Application or the OS. Step 310 may further include the LSR Module determining the Device Driver associated with the I/O Device targeted by the I/O Suspend Request.

At Step 312, the LSR Module queries the Device Driver to obtain the LSR Types supported by the Device Driver. In one embodiment of the invention, the LSR Types refer to the types of I/O Traffic which may be suspended for the I/O Device. For example, one I/O Device may support suspension of its DMA and PIO activities, and therefore the supported LSR Types for that I/O Device would be DMA and PIO activities.

In one embodiment of the invention, the LSR Module queries the Bus Controller Driver to determine if the LSR Types are supported by the I/O Bus generally, or by the Device Driver Specifically. If the LSR Types are supported by the I/O Bus, the Bus Controller Driver may forward the query to the Device Driver to determine whether the Device Driver specifically supports the specified LSR Types. Alternatively, once the LSR Module receives notification that the I/O Bus supports the specified LSR Types, the LSR Module may then query the Device Driver directly.

In one embodiment of the invention, the LSR Module may receive an I/O Suspend Request specifying that all I/O Traffic on the I/O Bus should be suspended. In response, the Bus Controller Driver may then interpret the request and send it to all Device Drivers associated with the I/O Devices on the I/O Bus.

At Step 314, the LSR Module compares the I/O Traffic specified in the I/O Suspend Request to the supported LSR types obtained from the Device Driver. If the I/O Device does not support suspending the I/O Traffic specified in the I/O Suspend Request, then at Step 316, the LSR Module instructs the requesting application that the Device Driver does not include the functionality to suspend the specified I/O Traffic.

If the I/O Device does support suspending the I/O Traffic specified in the I/O Suspend Request, then at Step 318, the LSR Module converts the I/O Suspend request to an LSR Suspend Request. In one embodiment of the invention, the LSR Module converts the I/O Suspend Request into an instruction that can be understood by the Device Driver. At Step 320, the LSR Module sends the LSR Suspend Request to the Device Driver. In one embodiment of the invention, the LSR Suspend Request is first sent to a Bus Controller Driver, where it is interpreted by the Bus Controller Driver before being sent to the Device Driver.

Figure 4:
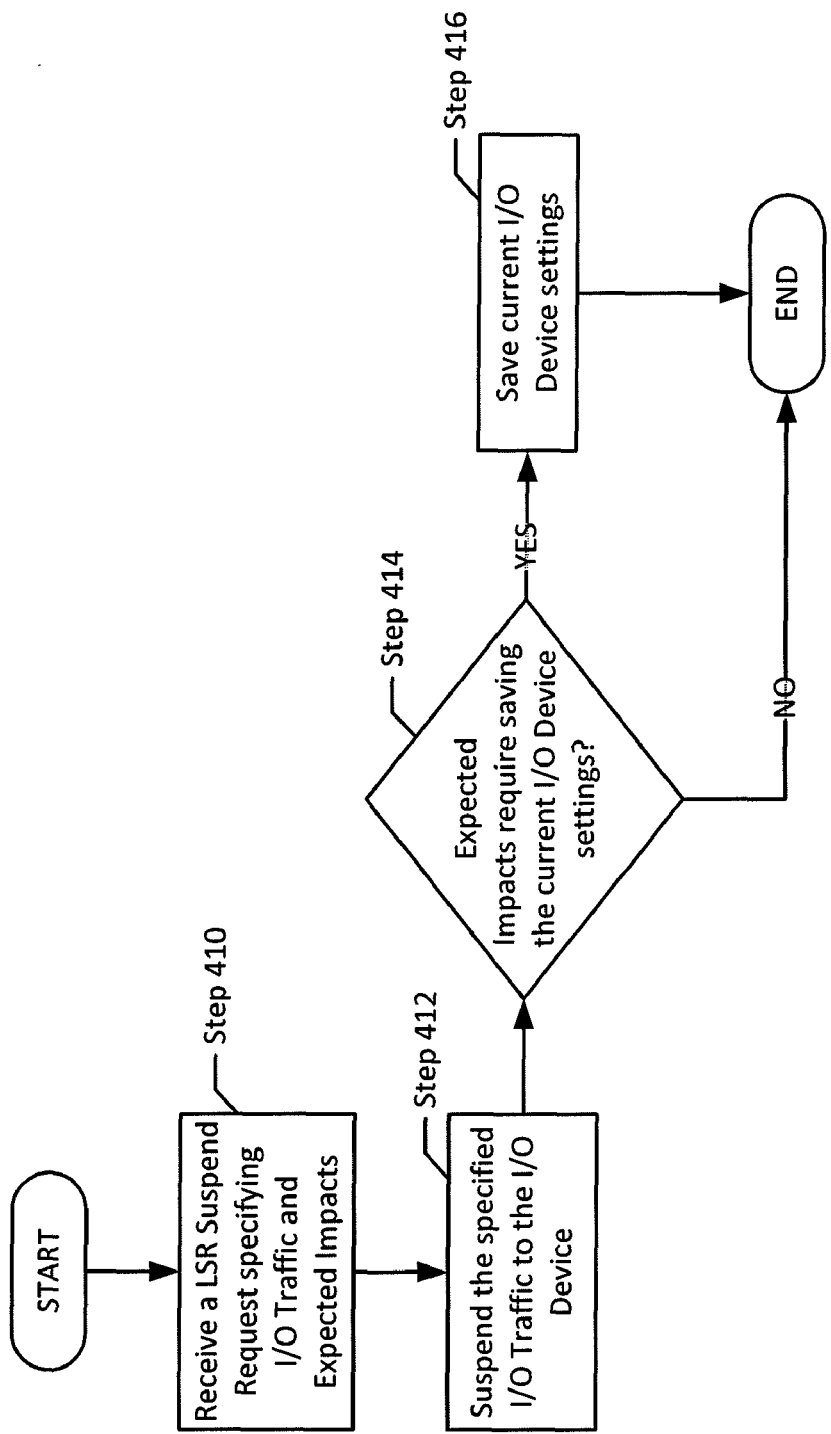

FIG. 4 shows a flowchart of a method for suspending an I/O Device by the Device Driver. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 4, may be included in performing this method. Accordingly, the specific arrangement of steps shown in FIG. 4 should not be construed as limiting the scope of the invention.

At Step 410, the Device Driver receives an LSR Suspend Request specifying a type of I/O Traffic to suspend, and the Expected Impacts. At Step 412, the Device Driver suspends the specified I/O Traffic between the I/O Device and the other components on the system. At Step 414, the Device Driver determines whether the Expected Impacts included in the LSR Suspend Request require that the current I/O Device settings be saved. If at Step 414, the Device Driver determines that the Expected Impacts do not require that the current I/O Device settings be saved, then no further action is taken. If at Step 414, the Device Driver determines that the Expected Impacts do require that the current I/O Device settings be saved, then at Step 416, the Device Driver obtains and stores the current I/O Device settings.

Figure 5:
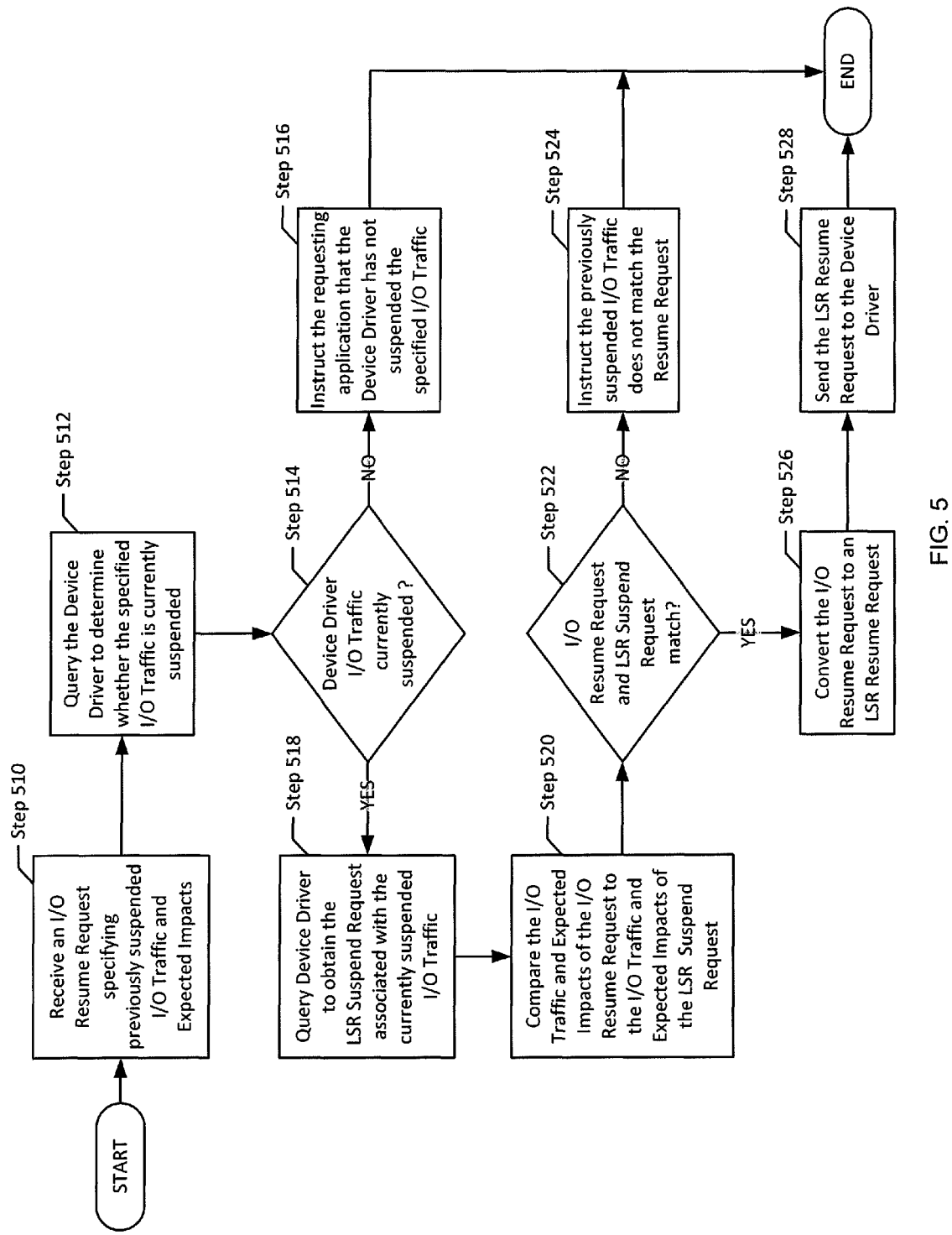

FIG. 5 shows a flowchart of a method for resuming an I/O Device by the LSR Module. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 5, may be included in performing this method. Accordingly, the specific arrangement of steps shown in FIG. 5 should not be construed as limiting the scope of the invention.

At Step 510, the LSR Module receives an I/O Resume Request specifying previously suspended I/O Traffic to resume, and the Expected Impacts. In one embodiment of the invention, the I/O Resume Request is received from an Application or the OS. Step 510 may further include the LSR Module determining the Device Driver associated with the I/O Device targeted by the I/O Resume Request. At Step 512, the LSR Module queries the Device Driver (directly or via a Bus Controller Driver) to determine whether the specified I/O Traffic is currently suspended. At Step 514, the LSR Module compares the I/O Traffic specified in the I/O Resume Request to the currently suspended I/O Traffic received from the Device Driver. If the currently suspended I/O Traffic on the I/O Device does not match the I/O Traffic specified in the I/O Resume Request, or if no I/O Traffic is currently suspended on the I/O Device, then at Step 516, the LSR Module instructs the requesting application that the I/O Device has not suspended the specified I/O Traffic.

If the currently suspended I/O Traffic on the I/O Device does match the I/O Traffic specified in the I/O Resume Request, then at Step 518, the LSR Module queries the Device Driver (directly or via a Bus Controller Driver) to obtain the LSR Suspend Request associated with the currently suspended I/O Traffic. At Step 520, the LSR Module compares the I/O Traffic and Expected Impacts of the I/O Resume Request to the I/O Traffic and Expected Impacts of the LSR Suspend Request. At Step 522, the LSR Module determines whether the I/O Traffic and Expected Impacts of the I/O Resume Request match the I/O Traffic and Expected Impacts of the LSR Suspend Request.

If at Step 522, the LSR Module determines that the I/O Resume Request does not match the LSR Suspend Request, then at Step 524, the LSR Module instructs the requesting application that the previously suspended I/O Traffic does not match the I/O Resume Request. If at Step 522, the LSR Module determines that the I/O Resume Request does match the LSR Suspend Request, then at Step 526, the LSR Module converts the I/O Resume Request to an LSR Resume Request. In one embodiment of the invention, the LSR Module converts the I/O Resume request into a message that can be understood by the Device Driver. At Step 528, the LSR Module sends the LSR Resume Request to the Device Driver. In one embodiment of the invention, the LSR Resume Request is first sent to a Bus Controller Driver, where it is interpreted by the Bus Controller Driver before being sent to the Device Driver.

Figure 6:
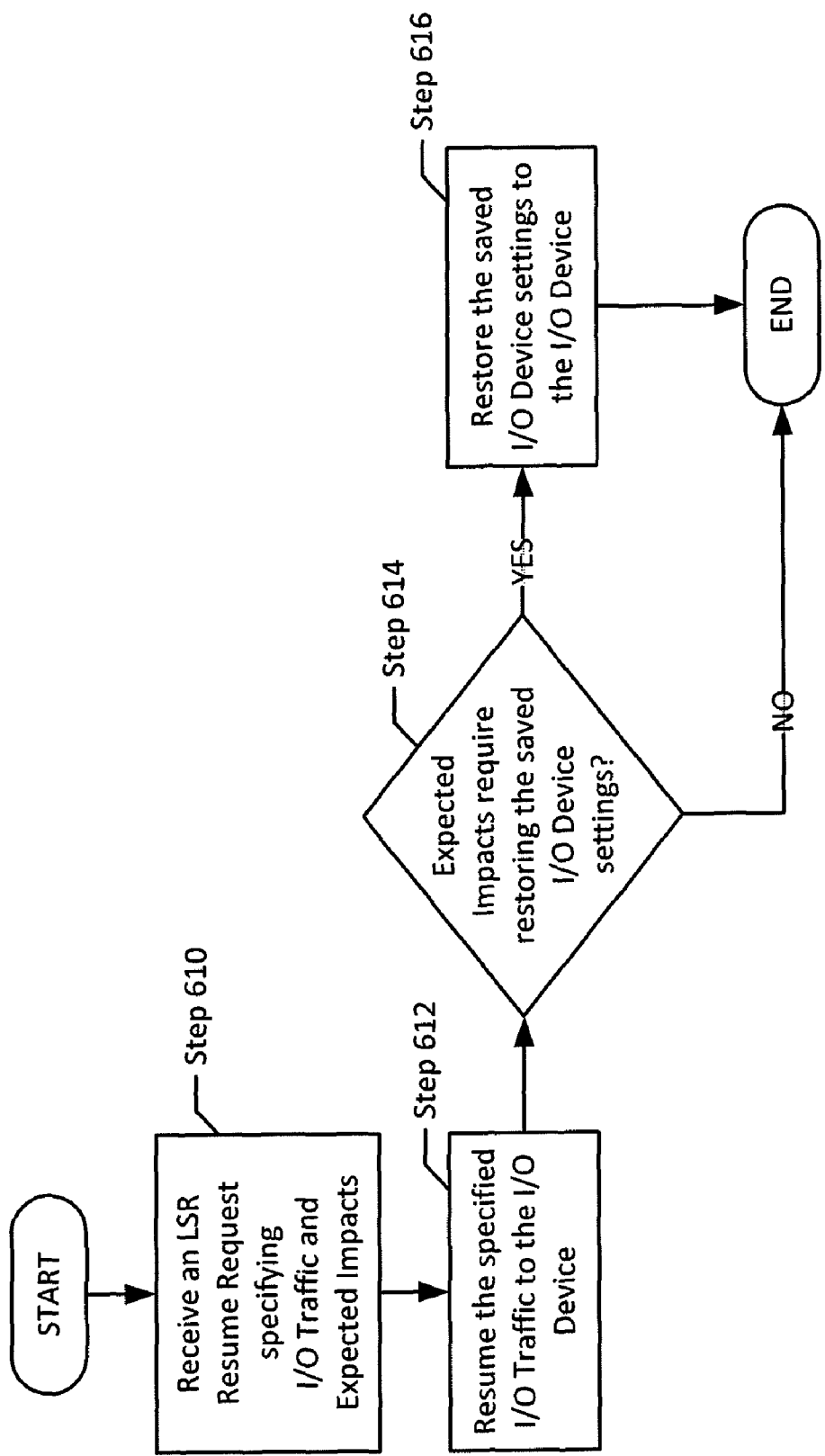

FIG. 6 shows a flowchart of a method for suspending an I/O Device by the Device Driver. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 6, may be included in performing this method. Accordingly, the specific arrangement of steps shown in FIG. 6 should not be construed as limiting the scope of the invention.

At Step 610, the Device Driver receives an LSR Resume Request specifying a type of I/O Traffic to suspend, and the Expected Impacts. At Step 612, the Device Driver resumes the specified I/O Traffic between the I/O Device and the other components on the system. At Step 614, the Device Driver determines whether the Expected Impacts included in the LSR Resume Request require that the previously saved I/O Device settings be restored. If at Step 614, the Device Driver determines that the Expected Impacts do not require that the saved I/O Device settings be restored, then no further action is taken. If at Step 614, the Device Driver determines that the Expected Impacts do require that the saved I/O Device settings be restored, then at Step 616, the Device Driver restores the previously saved I/O Device settings.

Figure 7A:
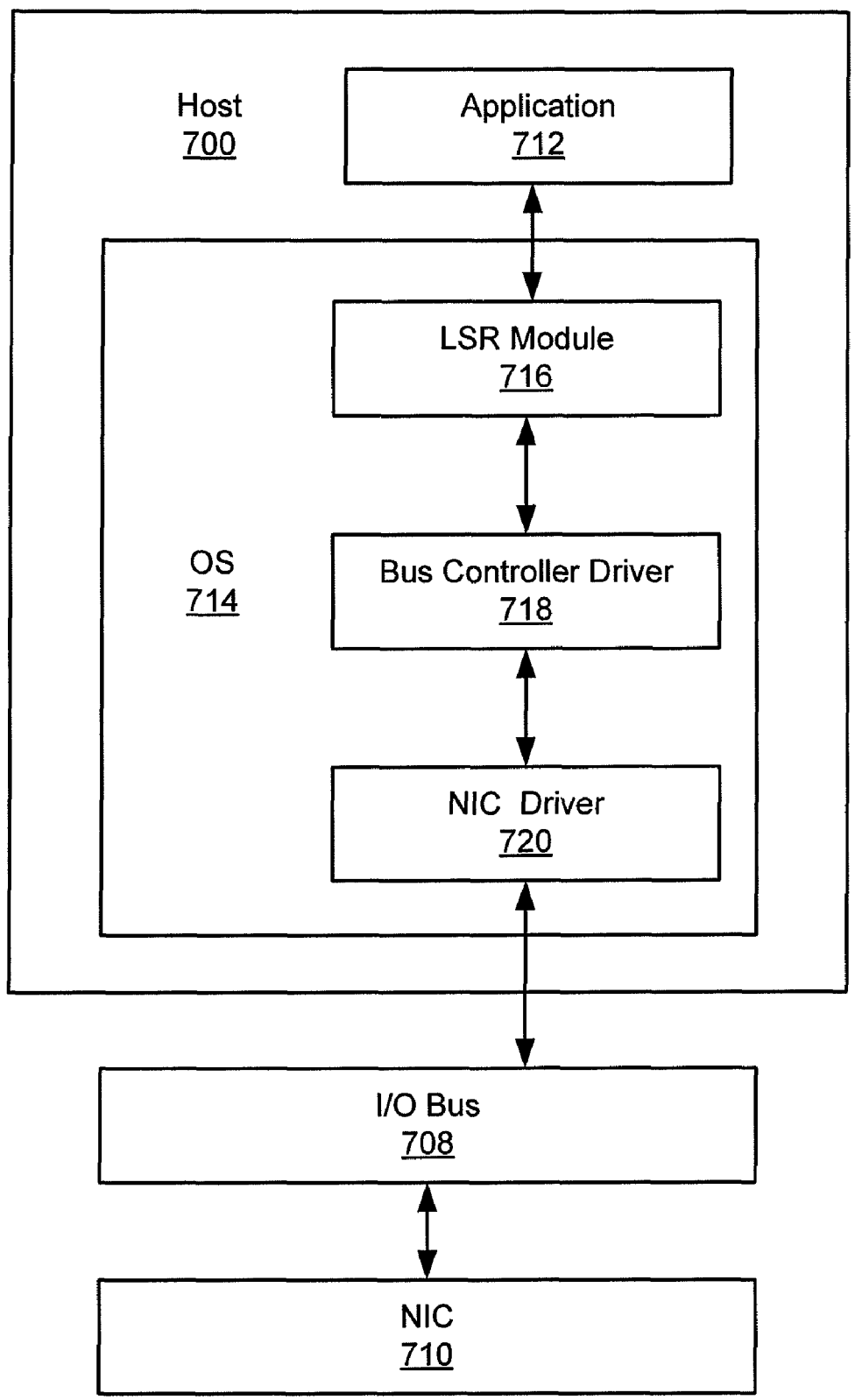
FIGS. 7A-7C, 8A-8C, and 9A-9C show examples in one or more embodiments of the invention.
Figure 7B:
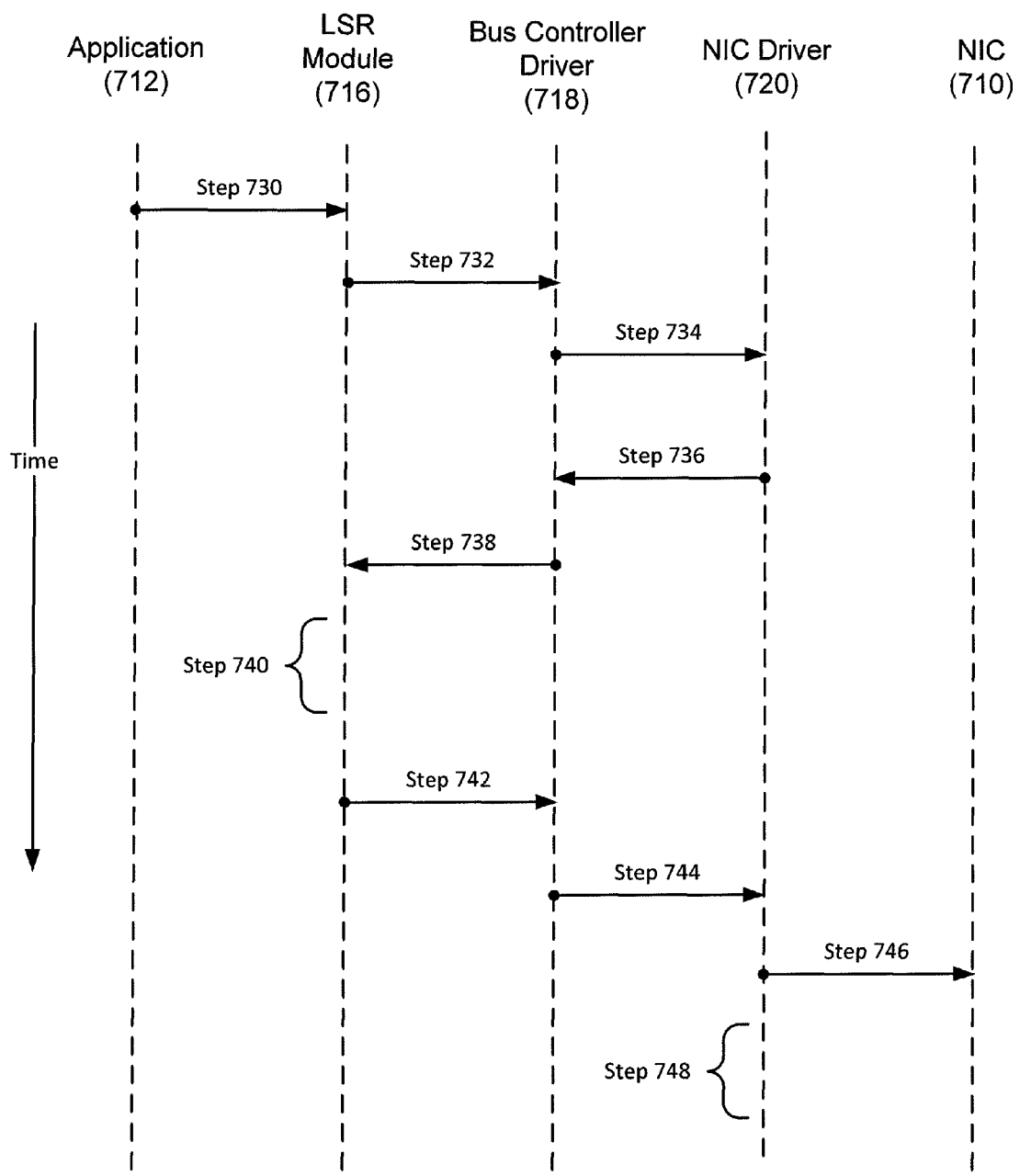
Figure 7C:
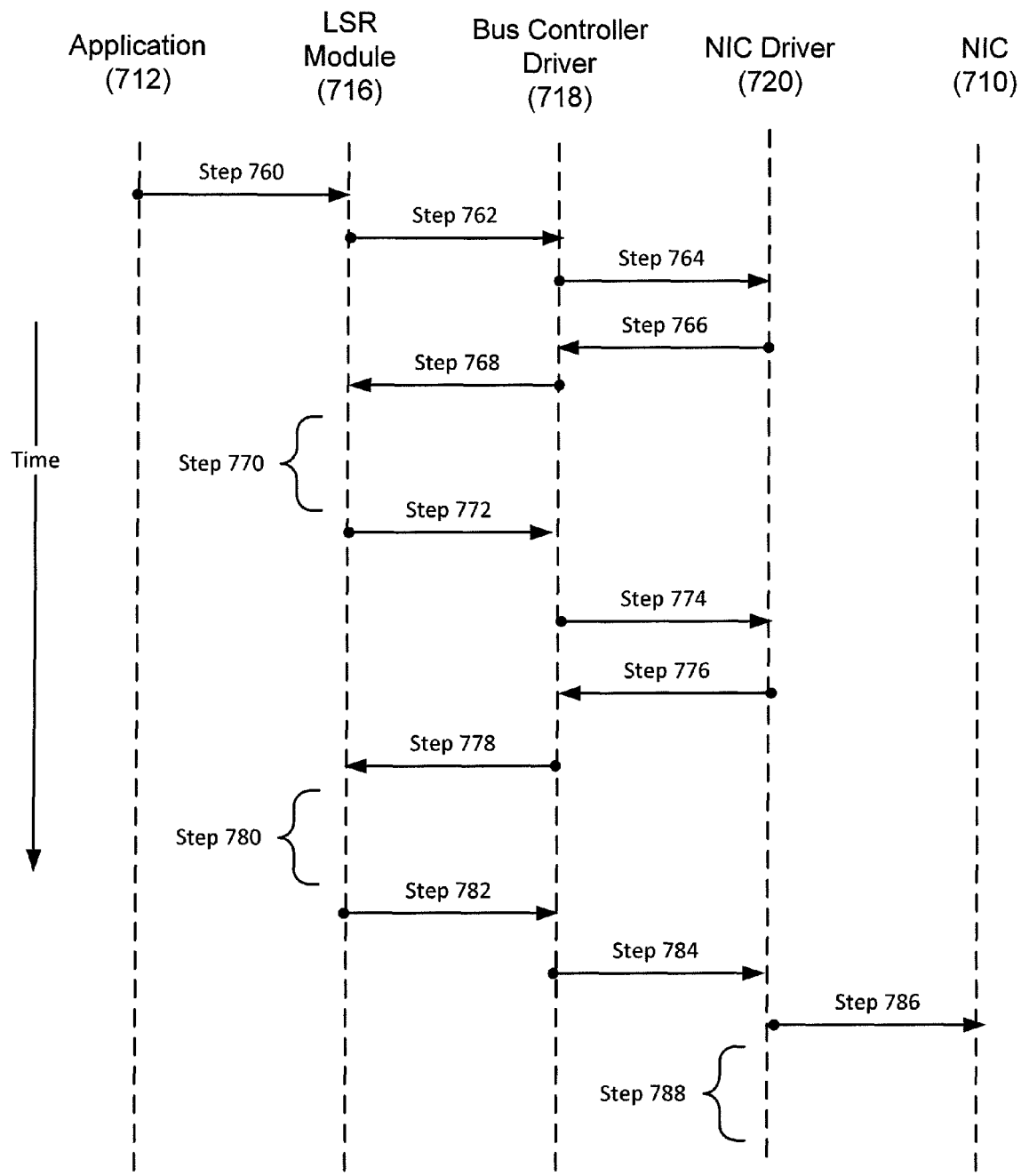

FIGS. 7A, 7B, and 7C show an exemplary system and timeline in accordance with one embodiment of the invention. Specifically, FIGS. 7A, 7B, and 7C depict an embodiment of the invention in which the I/O Bus address of an I/O Device changes. This may occur, for example, when an I/O Device (or group of I/O Devices) is moved from one port of the I/O Bus to another (or group of I/O Devices is preparented).

As shown in FIG. 7A, the system includes Host (700) connected to I/O Bus (708). I/O Bus (708) is also operatively connected to a Network Interface Card (NIC) (710). Host (700) includes an Application (712) executing on an OS (714). The OS (714) includes an LSR Module (716), a Bus Controller Driver (718), and a NIC Driver (720). In one embodiment of the invention, the NIC (710) is an I/O Device used to send and receive packets across a network of computers (e.g., a local area network, the Internet, etc.). In one embodiment of the invention, the NIC Driver (720) is a Device Driver as described above that is associated with the NIC (710).

FIG. 7B shows a timeline of an exemplary interaction between the elements in FIG. 7A. Specifically, FIG. 7B shows a timeline of communication in response to an application sending the LSR Module an I/O Suspend Request.

At Step 730, a User Application (712) sends an I/O Suspend Request to the LSR Module. For the purposes of this example, assume that the I/O Suspend Request specifies that all I/O Traffic on the NIC (710) should be suspended. Further, assume that the I/O Suspend request also indicates that the NIC (710) will be reset and assigned a new address on the I/O Bus (708). Therefore, the I/O Device settings should be saved.

In Step 732, the LSR Module (716) queries the Bus Controller Driver (718) to obtain the LSR Types supported by the NIC Driver (720). In Step 734, the Bus Controller Driver (718) interprets the query and sends the interpreted query to the NIC Driver (720). In Step 736, the NIC Driver (720) informs the Bus Controller Driver (718) that all LSR Types are supported (i.e., all I/O Traffic for the NIC may be suspended). In Step 738, the Bus Controller Driver (718) interprets the response and sends the interpreted response to the LSR Module (716).

At Step 740, the LSR Module (716) determines that the NIC Driver (720) supports suspending the LSR Types specified in the I/O Suspend Request. Also at Step 740, the LSR Module (716) converts the I/O Suspend Request to an LSR Suspend Request. At Step 742, the LSR Module (716) sends the LSR Suspend Request to the Bus Controller Driver (718). At Step 744, the Bus Controller Driver (718) interprets the LSR Suspend Request and sends the LSR Suspend Request to the NIC Driver (720).

At Step 746, the NIC Driver (720) suspends all I/O Traffic to the NIC (710). At Step 748, the NIC Driver (720) determines that the Expected Impacts of the LSR Suspend Request indicate that the I/O Device settings should be stored. Also at Step 748, the NIC Driver (720) stores the current I/O Device settings. In one embodiment of the invention, this may require that the NIC Driver (720) query the NIC (710) to obtain the current I/O Device settings.

While the NIC (710) is in a suspended state, the Application (712) as well as other Applications (not shown) and the OS (714) may continue to send I/O messages to the NIC (710). These I/O messages may be ignored, rejected, or stored until the NIC (710) is transitioned to an online state, and I/O Traffic resumes. Further, I/O messages may be handled (ignored, rejected, or stored) by the NIC Driver (712), the Bus Controller Driver (718), or the LSR module (716). Additionally, while the NIC (710) is suspended, I/O messages between the Application (712) and other I/O Devices (not shown) on the system continue normally, and are not impacted by the state of the NIC (710).

FIG. 7C shows a timeline of an exemplary interaction between the elements in FIG. 7A. Specifically, FIG. 7C shows a timeline of communication in response to an application sending the LSR Module an I/O Resume Request.

At Step 760, the LSR Module (716) receives an I/O Resume Request specifying that the NIC Driver (720) should resume all previously suspended I/O Traffic to the NIC (710). In Step 762, the LSR Module (716) queries the Bus Controller Driver (718) to determine whether the NIC Driver (720) has previously suspended all I/O Traffic to the NIC (710). In Step 764, the Bus Controller Driver (718) interprets the query and sends the interpreted query to the NIC Driver (720). In Step 766, the NIC Driver (720) informs the Bus Controller Driver (718) that all I/O Traffic to the NIC (710) is currently suspended. In Step 768, the Bus Controller Driver (718) interprets the response and sends the interpreted response to the LSR Module (716).

At Step 770, the LSR Module (716) determines all I/O Traffic to the NIC is currently suspended, and therefore may be resumed. At Step 772, the LSR Module (716) queries the Bus Controller Driver (718) to obtain the LSR Suspend Request associated with the currently suspended I/O Traffic. At Step 774, the Bus Controller Driver (718) interprets the query and sends the interpreted query to the NIC Driver (720). At Step 776, the NIC Driver (720) responds with the previously received LSR Suspend Request. At Step 778, the Bus Controller Driver (718) interprets the response and sends the interpreted response to the LSR Module (716).

At Step 780, the LSR Module (716) compares the I/O Traffic and Expected Impacts of the I/O Resume Request to the I/O Traffic and Expected Impacts of the LSR Suspend Request. Also at Step 780, the LSR Module (716) determines that the I/O Traffic and Expected Impacts of the I/O Resume Request match the I/O Traffic and Expected Impacts of the LSR Suspend Request and converts the I/O Resume Request to an LSR Resume Request. At Step 782, the LSR Module (716) sends the LSR Resume Request to the Bus Controller Driver (718). At Step 784, the Bus Controller Driver (718) interprets the LSR Resume Request and sends the interpreted LSR Resume Request to the NIC Driver (720).

At Step 786, the NIC Driver (720) resumes all I/O Traffic to the NIC (710). At Step 788, the NIC Driver (720) determines that the Expected Impacts of the LSR Resume Request indicate that the I/O Device settings should be restored. Also at Step 788, the NIC Driver (720) restores the previously stored I/O Device settings.

Figure 8A:
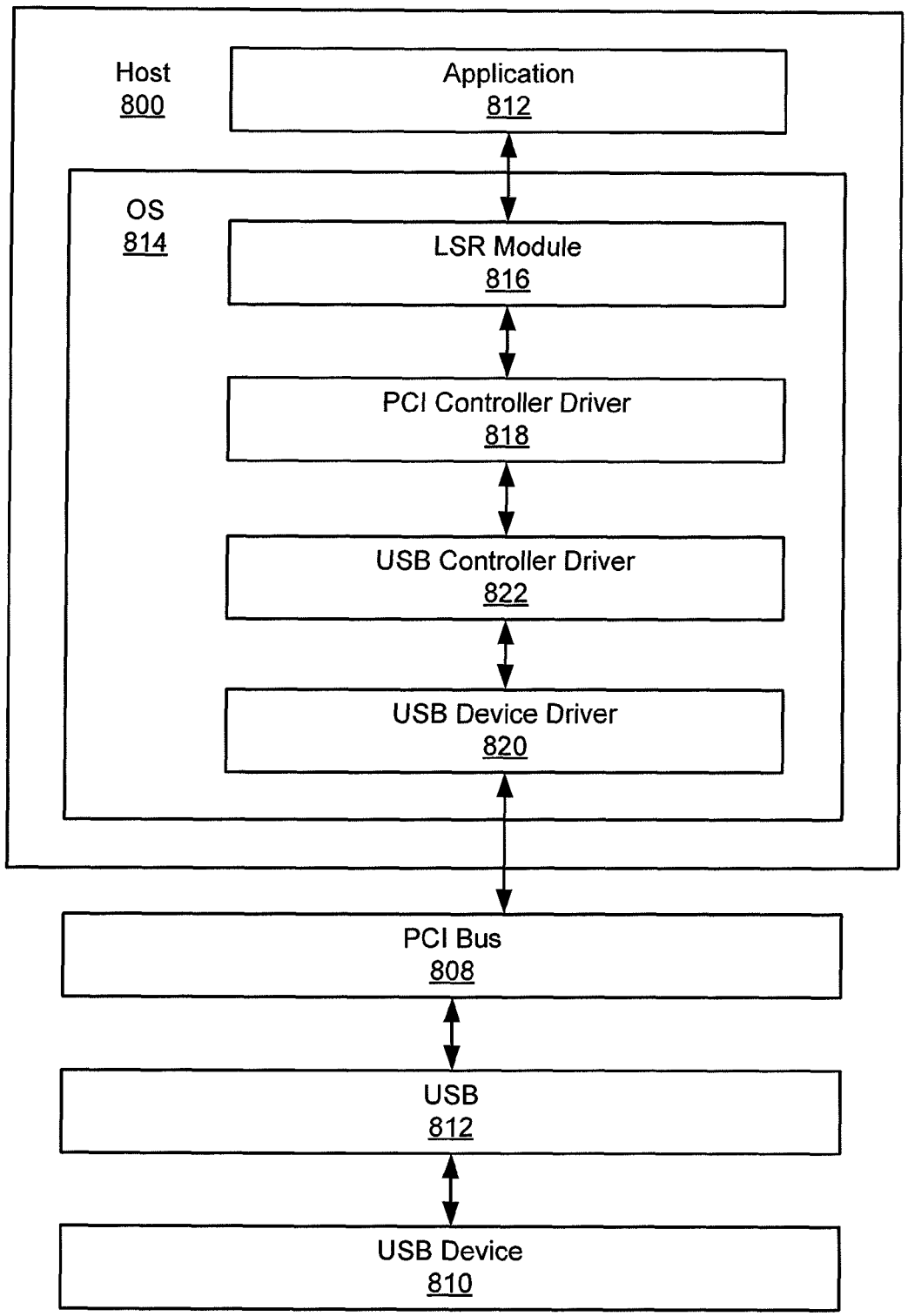
Figure 8B:
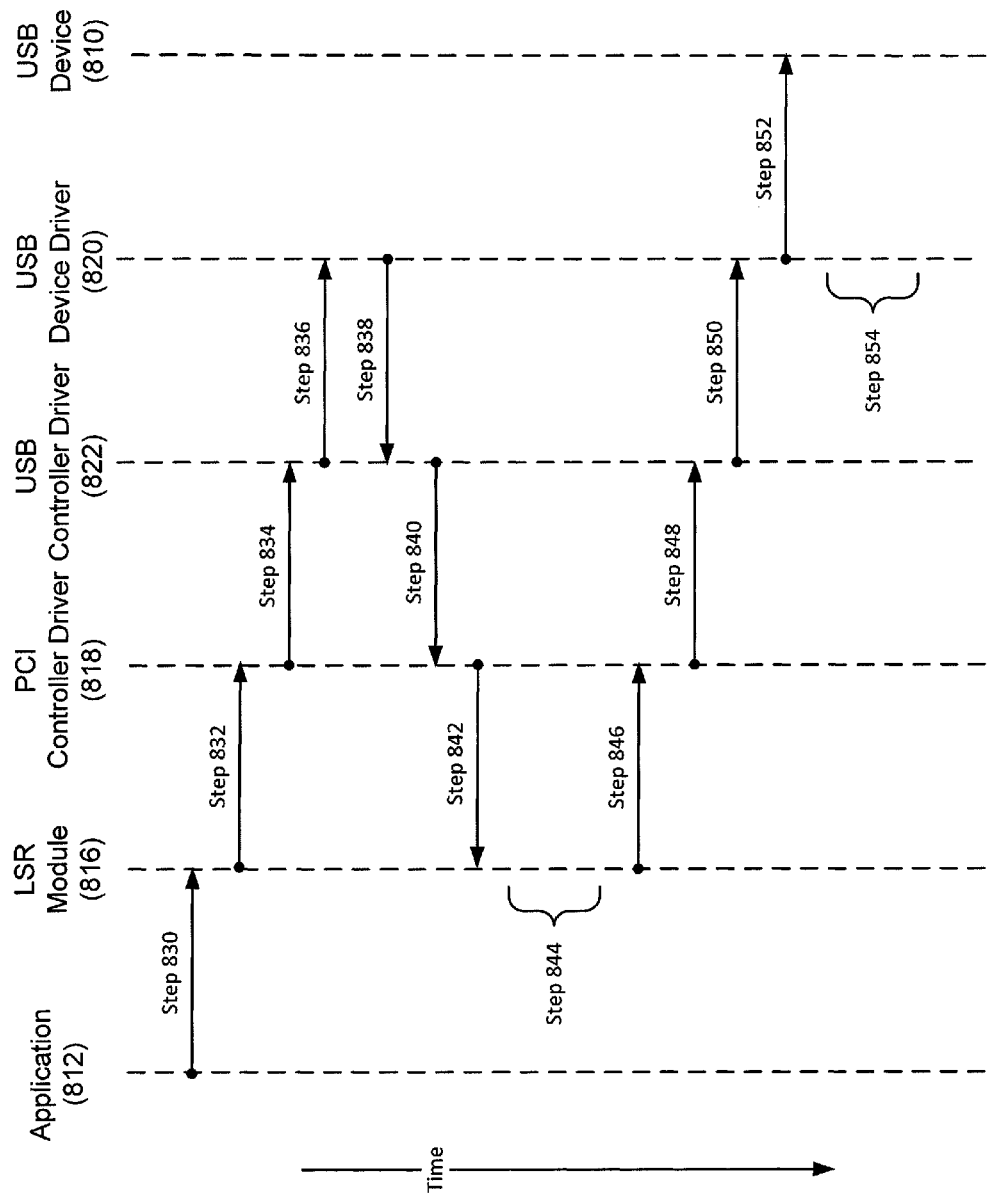
Figure 8C:
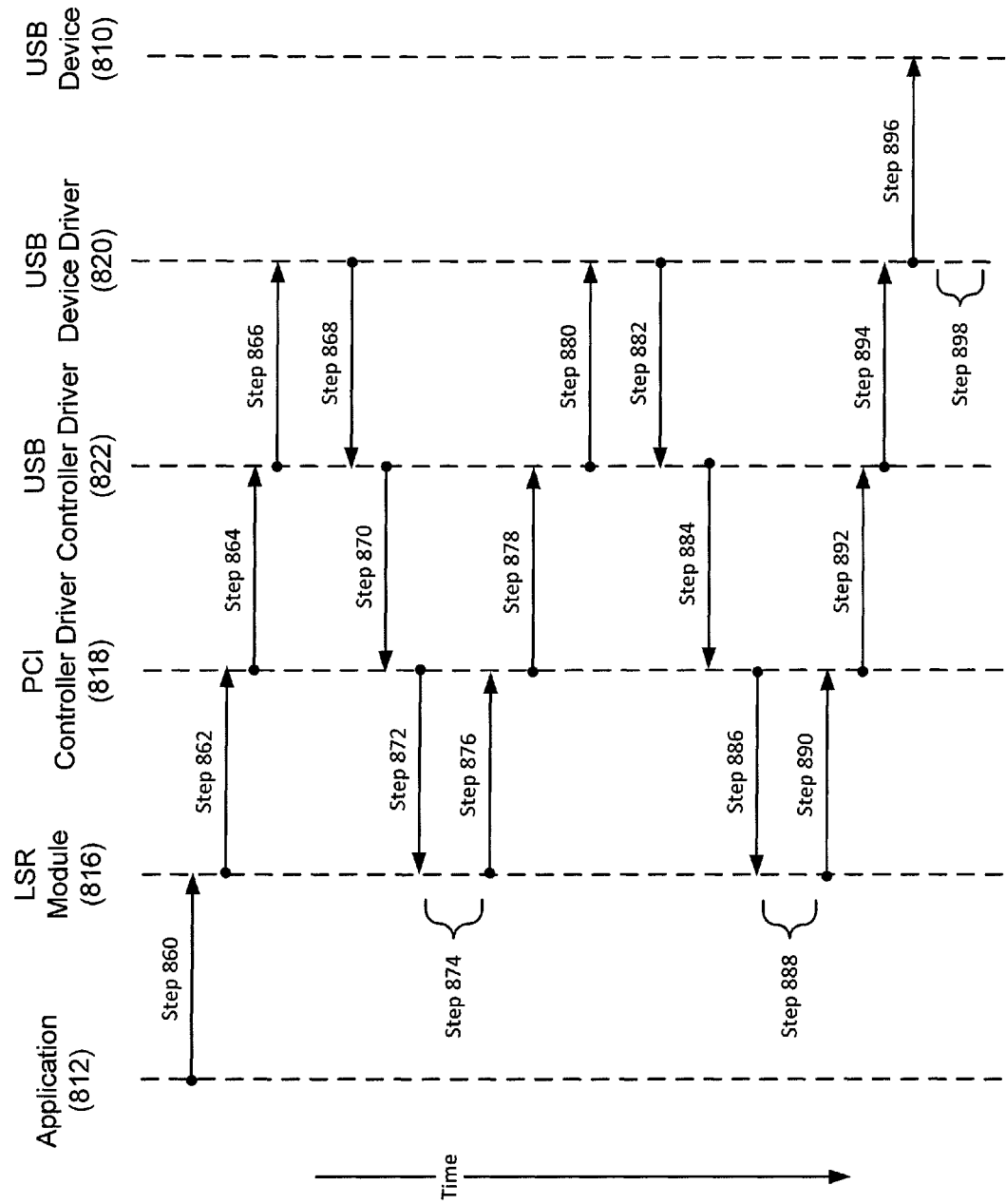

FIGS. 8A, 8B, and 8C show an exemplary system and timeline in accordance with one embodiment of the invention. As shown in FIG. 8A, the system includes Host (800) connected to PCI Bus (808). PCI Bus (808) is also operatively connected to USB (812). USB (812) is connected to USB Device (810). Host (800) includes an Application (812) executing on an OS (814). The OS (814) includes an LSR Module (816), a PCI Controller Driver (818), a USB Controller Driver (822), and a USB Device Driver (820).

FIG. 8B shows a timeline of an exemplary interaction between the elements in FIG. 8A. Specifically, FIG. 8B shows a timeline of communication in response to an application sending the LSR Module an I/O Suspend Request.

At Step 830, an Application (812) sends an I/O Suspend Request to the LSR Module (816). For the purposes of this example, assume that the I/O Suspend Request specifies that all I/O Traffic on the USB Device (810) should be suspended. Further, assume that the I/O Suspend request also indicates that the USB Device (810) will be replaced, and the USB Device settings should be saved.

In Step 832, the LSR Module (816) queries the PCI Controller Driver (818) to obtain the LSR Types supported by the USB Device Driver (820). In Step 834, the PCI Controller Driver (818) interprets the query and sends the interpreted query to the USB Controller Driver (822). In one embodiment of the invention, interpreting the query for supported LSR Types may include determining if the USB Controller supports the requested LSR Types. A determination that the LSR Types are not supported by the USB Controller may indicate that the same LSR Types are not supported by any of the USB Devices (e.g., USB Device (810)) connected to the USB (812).

In Step 836, the USB Controller Driver (822) interprets the query and sends the interpreted query to the USB Device Driver (820). In Step 838, the USB Device Driver (820) informs the USB Controller Driver (822) that all LSR Types are supported. In Step 840, the USB Controller Driver (822) interprets the response and sends the interpreted response to the PCI Controller Driver (818). In Step 842, the PCI Controller Driver (818) interprets the response and sends the interpreted response to the LSR Module (816).

At Step 844, the LSR Module (816) determines that the USB Device Driver (820) supports suspending the LSR Types specified in the I/O Suspend Request. Also at Step 844, the LSR Module (816) converts the I/O Suspend Request to an LSR Suspend Request. At Step 846, the LSR Module (816) sends the LSR Suspend Request to the PCI Controller Driver (818). At Step 848, the PCI Controller Driver (818) interprets the LSR Suspend Request and send the LSR Suspend Request to the USB Controller Driver (822). At Step 850, the USB Controller Driver (822) interprets the LSR Suspend Request and sends the LSR Suspend Request to the USB Device Driver (820).

At Step 852, the USB Device Driver (820) suspends all I/O Traffic to the USB Device (810). At Step 854, the USB Device Driver (820) determines that the Expected Impacts of the LSR Suspend Request indicate that the USB Device settings should be stored.

FIG. 8C shows a timeline of an exemplary interaction between the elements in FIG. 8A. Specifically, FIG. 8C shows a timeline of communication in response to an application sending the LSR Module an I/O Resume Request.

At Step 860, the LSR Module receives an I/O Resume Request specifying that the USB Device Driver (820) should resume all previously suspended I/O Traffic to the USB Device (810). In Step 862, the LSR Module (816) queries the PCI Controller Driver (818) to determine whether the USB Device Driver (820) has previously suspended all I/O Traffic to the USB Device (810). In Step 864, the PCI Controller Driver (818) interprets the query and sends the interpreted query to the USB Controller Driver (822). In Step 866, the USB Controller Driver (822) interprets the query and sends the interpreted query to the USB Device Driver (820).

In Step 868, the USB Device Driver (820) informs the USB Controller Driver (822) that all I/O Traffic to the USB Device (810) is currently suspended. In Step 870, the USB Controller Driver (822) interprets the response and sends the interpreted response to the PCI Controller Driver (818). In Step 872, the PCI Controller Driver (818) interprets the response and sends the interpreted response to the LSR Module (816).

At Step 874, the LSR Module (816) determines all I/O Traffic to the USB Device (810) is currently suspended, and therefore may be resumed. At Step 876, the LSR Module (816) queries the PCI Controller Driver (818) to obtain the LSR Suspend Request associated with the currently suspended I/O Traffic. At Step 878, the PCI Controller Driver (818) interprets the query and sends the interpreted query to the USB Controller Driver (822). At Step 880, the USB Controller Driver (822) interprets the query and sends the interpreted query to the USB Device Driver (820). At Step 882, the USB Device Driver (820) responds with the previously received LSR Suspend Request. At Step 884, the USB Controller Driver (822) interprets the response and sends the interpreted response to the PCI Controller Driver (818). At Step 886, the PCI Controller Driver (818) interprets the response and sends the interpreted response to the LSR Module (816).

At Step 888, the LSR Module (816) compares the I/O Traffic and Expected Impacts of the I/O Resume Request to the I/O Traffic and Expected Impacts of the LSR Suspend Request. Also at Step 888, the LSR Module (816) determines that the I/O Traffic and Expected Impacts of the I/O Resume Request match the I/O Traffic and Expected Impacts of the LSR Suspend Request and converts the I/O Resume Request to an LSR Resume Request. At Step 890, the LSR Module sends the LSR Resume Request to the PCI Controller Driver (818). At Step 892, the PCI Controller Driver (818) interprets the LSR Resume Request and sends the interpreted LSR Resume Request to the USB Controller Driver (822). At Step 894, the USB Controller Driver (822) interprets the LSR Resume Request and sends the interpreted LSR Resume Request to the USB Device Driver (820).

At Step 896, the USB Device Driver (820) resumes all I/O Traffic to the USB Device (810). At Step 898, the USB Device Driver (820) determines that the Expected Impacts of the LSR Resume Request indicate that the USB Device settings should be restored. Also at Step 898, the USB Device Driver (820) restores the previously stored USB Device (810) settings.

Figure 9A:
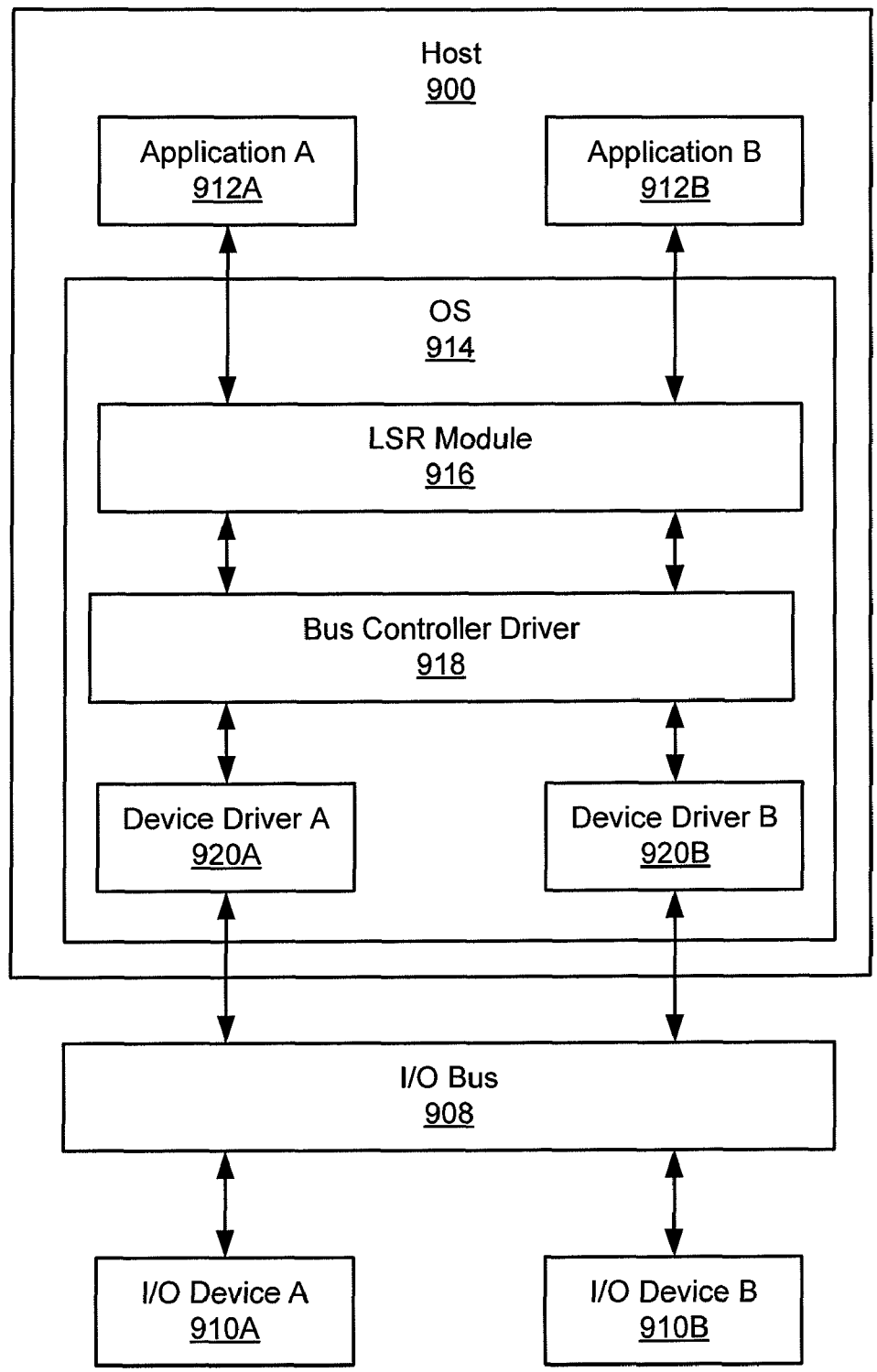
Figure 9B:
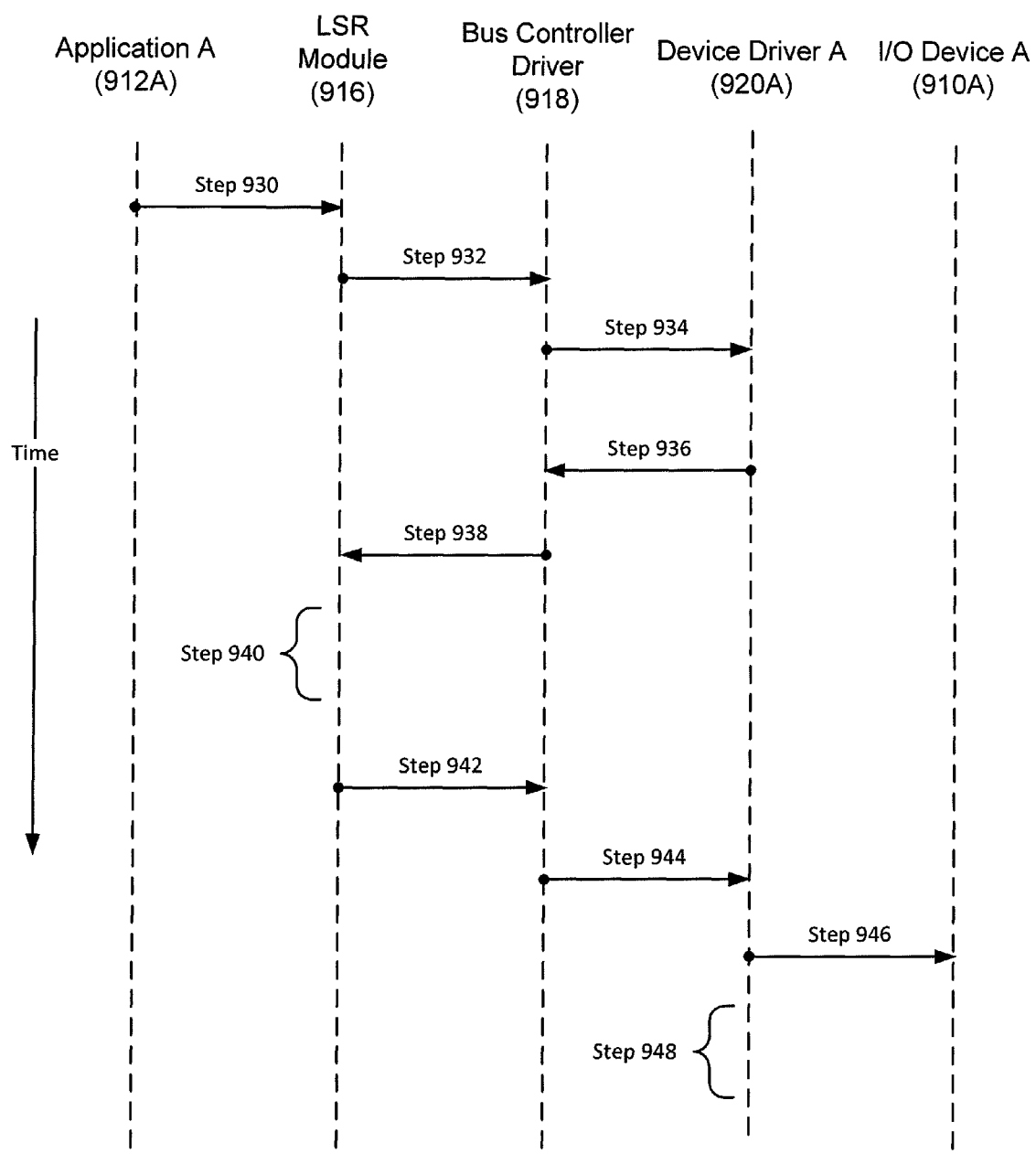
Figure 9C:
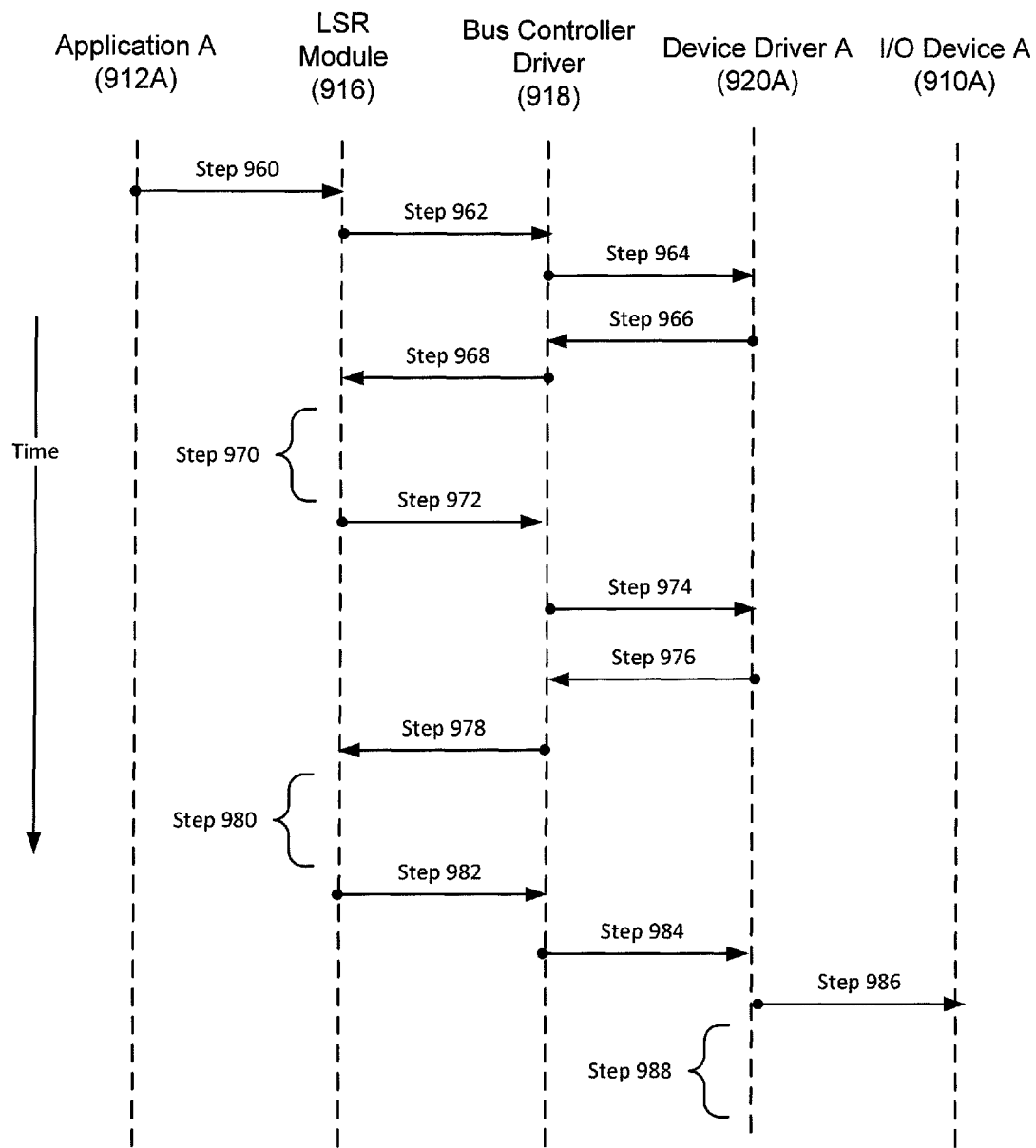

FIGS. 9A, 9B, and 9C show an exemplary system and timeline in accordance with one embodiment of the invention. Specifically, FIGS. 9A, 9B, and 9C depict an embodiment of the invention in which the platform interrupt controllers are reconfigured during an I/O Device suspend.

As shown in FIG. 9A, the system includes Host (900) connected to I/O Bus (908). I/O Bus (908) is also operatively connected to a I/O Device A (910A) and I/O Device B (910B). Host (900) includes Application A (912A) and Application B (912B) executing on an OS (914). The OS (914) includes an LSR Module (916), a Bus Controller Driver (918), Device Driver A (920A), and Device Driver B (920B). In this example Device Driver A (920A) is associated with I/O Device A (910A), and Device Driver B (920B) is associated with I/O Device B (910B).

FIG. 9B shows a timeline of an exemplary interaction between the elements in FIG. 9A. Specifically, FIG. 9B shows a timeline of communication in response to an application sending the LSR Module an I/O Suspend Request.

At Step 930, Application A (912A) sends an I/O Suspend Request to the LSR Module. For the purposes of this example, assume that the I/O Suspend Request specifies that all interrupts on I/O Device A (910A) should be suspended. Further, assume that the I/O Suspend request also indicates that the interrupt controllers for I/O Device A (910A) will be reconfigured. Therefore, the I/O Device settings for I/O Device A (910A) should be not saved.

In Step 932, the LSR Module (916) queries the Bus Controller Driver (918) to obtain the LSR Types supported by Device Driver A (920A). In Step 934, the Bus Controller Driver (918) interprets the query and sends the interpreted query to Device Driver A (920A). In Step 936, Device Driver A (920A) informs the Bus Controller Driver (918) that all LSR Types are supported (i.e., all I/O Traffic for I/O Device A (910A) may be suspended). In Step 938, the Bus Controller Driver (918) interprets the response and sends the interpreted response to the LSR Module (916).

At Step 940, the LSR Module (916) determines that Device Driver A (920A) supports suspending interrupts as specified in the I/O Suspend Request. Also at Step 940, the LSR Module (916) converts the I/O Suspend Request to an LSR Suspend Request. At Step 942, the LSR Module (916) sends the LSR Suspend Request to the Bus Controller Driver (918). At Step 944, the Bus Controller Driver (918) interprets the LSR Suspend Request and sends the LSR Suspend Request to Device Driver A (920A).

At Step 946, Device Driver A (920A) suspends all interrupts associated with I/O Device A (910A). At Step 948, Device Driver A (920A) determines that the Expected Impacts of the LSR Suspend Request indicate that the I/O Device settings do not need to be stored.

FIG. 9C shows a timeline of an exemplary interaction between the elements in FIG. 9A. Specifically, FIG. 9C shows a timeline of communication in response to an application sending the LSR Module an I/O Resume Request.

Prior to Step 960, and while I/O Device A (910A) is in a suspended state with regard to interrupt traffic, I/O traffic between Application A (912A), Application B (912B), the OS (914), and I/O Device B (910B) will continue uninterrupted. For example, I/O Device B (910B) may continue to issue interrupts to Application A (912A), Application B (912B), and the OS (914) while I/O Device A (910A) is suspended with regard to interrupt traffic. Further, I/O traffic other than interrupt traffic between Application A (912A), Application B (912B), the OS (914), and I/O Device A (910A) will also continue uninterrupted. For example, I/O Device A (910A) may continue to receive PIO and DMA requests from Application A (912A), Application B (912B), and the OS (914) while I/O Device A (910A) is suspended with regard to interrupt traffic.

At Step 960, the LSR Module (916) receives an I/O Resume Request specifying that Device Driver A (920A) should resume all previously suspended I/O Traffic to I/O Device A (910A). In Step 962, the LSR Module (916) queries the Bus Controller Driver (918) to determine whether Device Driver A (920A) has previously suspended interrupt traffic to I/O Device A (910A). In Step 964, the Bus Controller Driver (918) interprets the query and sends the interpreted query to Device Driver A (920A). In Step 966, Device Driver A (920A) informs the Bus Controller Driver (918) that interrupt traffic to I/O Device A (910A) is currently suspended. In Step 968, the Bus Controller Driver (918) interprets the response and sends the interpreted response to the LSR Module (916).

At Step 970, the LSR Module (916) determines that interrupt traffic to I/O Device A (910A) is currently suspended, and therefore may be resumed. At Step 972, the LSR Module (916) queries the Bus Controller Driver (918) to obtain the LSR Suspend Request associated with the currently suspended interrupt traffic. At Step 974, the Bus Controller Driver (918) interprets the query and sends the interpreted query to Device Driver A (920A). At Step 976, Device Driver A (920A) responds with the previously received LSR Suspend Request. At Step 978, the Bus Controller Driver (918) interprets the response and sends the interpreted response to the LSR Module (916).

At Step 980, the LSR Module (916) compares the I/O Traffic and Expected Impacts of the I/O Resume Request to the I/O Traffic and Expected Impacts of the LSR Suspend Request. Also at Step 980, the LSR Module (916) determines that the I/O Traffic and Expected Impacts of the I/O Resume Request match the I/O Traffic and Expected Impacts of the LSR Suspend Request and converts the I/O Resume Request to an LSR Resume Request. At Step 982, the LSR Module (916) sends the LSR Resume Request to the Bus Controller Driver (918). At Step 984, the Bus Controller Driver (918) interprets the LSR Resume Request and sends the interpreted LSR Resume Request to Device Driver A (920A).

At Step 986, Device Driver A (920A) resumes interrupt traffic for I/O Device A (910A). At Step 988, Device Driver A (920A) determines that the Expected Impacts of the LSR Resume Request indicate that the I/O Device settings should not be restored.

Figure 10:
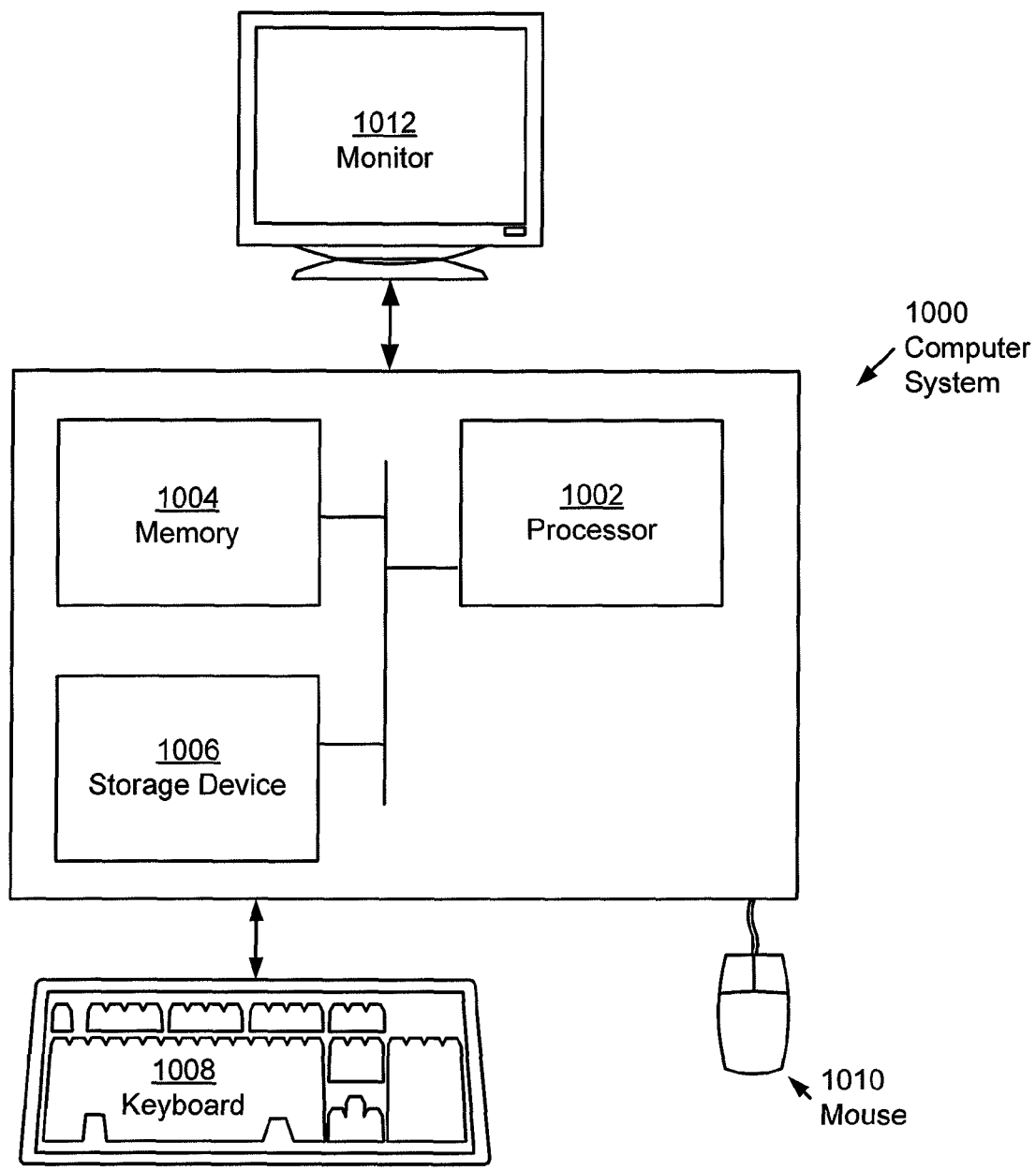
FIG. 10 shows a system in accordance with one or more embodiments of the invention.

Embodiments of the invention may be implemented on virtually any type of computer regardless of the platform being used. For example, as shown in FIG. 10, a computer system (1000) includes one or more processor(s) (1002), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). The computer (1000) may also include input means, such as a keyboard (1008), a mouse (1010), or a microphone (not shown). Further, the computer (1000) may include output means, such as a monitor (1012) (e.g., a liquid crystal display (LCD), a plasma display, or cathode ray tube (CRT) monitor). The computer system (1000) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., first computer system, second computer system, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A non-transitory computer readable medium comprising instructions, which when executed by a processor perform a method, the method comprising:
   sending a first input/output (I/O) message to an I/O device on an I/O bus, wherein the I/O device comprises an I/O device state, wherein the first I/O message is a first I/O traffic type;
   receiving, from a live suspend and resume (LSR) module, a first LSR suspend request comprising a first suspend instruction to suspend the first I/O traffic type, a first expected impact, and an I/O device identifier identifying the I/O device;
   setting the I/O device state to suspended in response to the receiving the first LSR suspend request, wherein no I/O messages of the first I/O traffic type are sent to the I/O device while the I/O device state is suspended;
   receiving, from the LSR module, a first LSR resume request comprising a first resume instruction to resume the first I/O traffic type, the first expected impact, and the I/O device identifier;
   setting the I/O device state to online in response to the receiving the first LSR resume request;
   sending a second I/O message to the I/O device, wherein the second I/O message is the first I/O traffic type;
   determining that the first expected impact requires saving I/O device settings prior to the setting the I/O device state to suspend;
   saving the I/O device settings in response to the determination; and
   restoring the saved I/O device settings after the setting the I/O device state to online.

2. The computer readable medium of claim 1, the method further comprising:
   sending a third I/O message to the I/O device on the I/O bus, wherein the third I/O message is a second I/O traffic type;
   receiving, from the LSR module, a second LSR suspend request comprising a second suspend instruction to suspend the second I/O traffic type, a second expected impact, and the I/O device identifier;
   setting the I/O device state to suspended in response to the receiving the second LSR suspend request, wherein no I/O messages of the second I/O traffic type are sent to the I/O device while the I/O device state is suspended;
   receiving, from the LSR module, a second LSR resume request comprising a second resume instruction to resume the second I/O traffic type, the second expected impact, and the I/O device identifier;
   setting the I/O device state to online in response to the receiving the second LSR resume request; and
   sending a fourth I/O message to the I/O device, wherein the fourth I/O message is the second I/O traffic type.

3. The computer readable medium of claim 1, wherein the device driver is executing on a host, wherein the host is operatively connected to the I/O bus.

4. The computer readable medium of claim 1, wherein the first expected impact is one selected from a group consisting of a direct memory access (DMA) address change, a DMA properties change, a device reset a device replacement, and a loss of power.

5. The computer readable medium of claim 1, wherein the first I/O traffic type is one selected from a group consisting of direct memory access (DMA) activities, programmed I/O activities, and interrupts.

6. A non-transitory computer readable medium comprising instructions, which when executed by a processor perform a method, the method comprising:
   receiving a first input/output (I/O) suspend request comprising a first suspend instruction to suspend a first I/O traffic type, a first expected impact, and a first I/O device identifier identifying a first I/O device;
   obtaining, from a first device driver for the first I/O device, a live suspend and resume (LSR) type supported by the first device driver;

making a first determination, using the LSR type, that the first device driver supports suspending the first I/O traffic type;
converting, in response to the first determination, the I/O suspend request into a first LSR suspend request; and
sending the first LSR suspend request to the first device driver;
receiving a first I/O resume request comprising a first resume instruction to resume the first I/O traffic type, the first expected impact, and the first I/O device identifier, wherein the first I/O device comprises a first I/O device state;
making a second determination that the first I/O device state is suspended, wherein no I/O messages of the first I/O traffic type are sent to the first I/O device while the first I/O device state is suspended;
obtaining a first LSR suspend request from the first device driver;
making a third determination, using the first LSR suspend request and the first I/O resume request, that the first I/O traffic type may be resumed;
converting, in response to the third determination, the first I/O resume request into a first LSR resume request; and
sending the first LSR resume request to the first device driver.

7. The computer readable medium of claim 6, the method further comprising:
receiving, from an application, a second I/O resume request comprising a second resume instruction to resume a second I/O traffic type, a second expected impact, and the first I/O device identifier;
making a fourth determination that the first I/O device state is suspended, wherein no I/O messages of the second I/O traffic type are sent to the first I/O device while the first I/O device state is suspended;
obtaining, from the first device driver, a second LSR suspend request;
making a fifth determination, using the second LSR suspend request and second I/O resume request, that the second I/O traffic type may not be resumed; and
instructing the application that the second I/O traffic type may not be resumed.

8. The computer readable medium of claim 6, the method further comprising:
receiving, from an application, a second I/O resume request comprising a second resume instruction to resume a second I/O traffic type, a second expected impact, and the first I/O device identifier;
making a fourth determination that the first I/O device state is not suspended; and
instructing, in response to the fourth determination, the application that the second I/O traffic type is not suspended.

9. The computer readable medium of claim 6, the method further comprising:
receiving, from an application, a second I/O resume request comprising a second resume instruction to resume a second I/O traffic type, a second expected impact, and a second I/O device identifier identifying a second I/O device, wherein the second I/O device comprises a second I/O device state;
making a fourth determination that the second I/O device state is suspended, wherein no I/O messages of the second I/O traffic type are sent to the second I/O device while the second I/O device state is suspended;
obtaining, from a second device driver for the second I/O device, a second LSR suspend request;
making a fifth determination, using the second LSR suspend request and the second I/O resume request, that the second I/O traffic type may be resumed; and
converting, in response to the fifth determination, the second I/O resume request into a second LSR resume request; and
sending, response to the fifth determination the second LSR resume request to the second device driver.

10. The computer readable medium of claim 6, wherein the first determination comprises:
querying the first device driver to obtain the first I/O device state and a currently suspended I/O traffic type.

11. The computer readable medium of claim 6, wherein the first expected impact is one selected from a group consisting of a direct memory access (DMA) address change, a DMA properties change, a device reset a device replacement, and a loss of power.

12. The computer readable medium of claim 6, wherein the first I/O traffic type is one selected from a group consisting of direct memory access (DMA) activities, programmed I/O activities, and interrupts.

13. The computer readable medium of claim 6, wherein the LSR module is executing on a host operatively connected to an I/O bus, wherein the first I/O device is operatively connected to the I/O bus.

14. A system comprising:
an input/output (I/O) bus;
an I/O device comprising an I/O device state, wherein the I/O device is operatively connected to the I/O bus;
a host, operatively connected to the I/O bus, comprising:
a device driver configured to:
send a first I/O message to the I/O device using the I/O bus, wherein the first I/O message is of an I/O traffic type;
receive a live suspend and resume (LSR) suspend request comprising a suspend instruction to suspend the I/O traffic type, an expected impact, and an I/O device identifier identifies the I/O device;
set the I/O device state to suspended in response to the receiving the LSR suspend request, wherein no I/O messages of the I/O traffic type are sent to the I/O device while the I/O device state is suspended;
receive an LSR resume request;
set the I/O device state to online in response to the receiving the LSR resume request; and
send a second I/O message to the I/O device, wherein the second I/O message is the I/O traffic type; and
the LSR module configured to:
receive an I/O resume request comprising a resume instruction to resume the I/O traffic type, the expected impact, and the I/O device identifier;
make a first determination that the I/O device state is suspended;
obtain the LSR suspend request from the device driver;
make a second determination, using the LSR suspend request and the I/O resume request, that the I/O traffic type may be resumed; and
convert, in response to the second determination, the I/O resume request into the LSR resume request;
a bus controller driver for the I/O bus, configured to:
receive the LSR suspend request from the LSR module;
determine, using the LSR suspend request, that the I/O bus supports suspending the I/O traffic type; and send, in response to the determination, the LSR suspend request to the device driver.

15. The system of claim 14, further comprising:
a secondary I/O bus controlled by a secondary bus controller driver, wherein the I/O device is operatively connected to the I/O bus via the secondary I/O bus;
a primary bus controller driver for the I/O bus, configured to:
receive the LSR suspend request from the LSR module;
determine, using the LSR suspend request, that the I/O bus supports suspending the I/O traffic type; and
send, in response to the determination, the LSR suspend request to the secondary bus controller driver; and
the secondary bus controller driver configured to:
receive the LSR suspend request from the primary bus controller driver;
determine, using the LSR suspend request, that the secondary I/O bus supports suspending the I/O traffic type; and
send, in response to the determination, the LSR suspend request to the device driver.

16. The system of claim 14, wherein the LSR module is further configured to:
receive an I/O suspend request comprising the suspend instruction to suspend the I/O traffic type, the expected impact, and the I/O device identifier;
obtain, from the device driver, an LSR type supported by the device driver;
make a third determination, using the LSR type, that the device driver supports suspending the I/O traffic type;
convert, in response to the third determination, the I/O suspend request into the LSR suspend request; and
send the LSR suspend request to the device driver.

17. The system of claim 14,
wherein the expected impact is one selected from a group consisting of a direct memory access (DMA) address change, a DMA properties change, a device reset a device replacement, and a loss of power, and
wherein the I/O traffic type is one selected from a group consisting of direct memory access (DMA) activities, programmed I/O activities, and interrupts.

\* \* \* \* \*

UNITED STATES PATENT AND TRADEMARK OFFICE
CERTIFICATE OF CORRECTION

PATENT NO. : 8,307,127 B1
APPLICATION NO. : 13/176888
DATED : November 6, 2012
INVENTOR(S) : Zeng et al.

Page 1 of 1

It is certified that error appears in the above-identified patent and that said Letters Patent is hereby corrected as shown below:

In column 10, line 2, delete "preparented)." and insert -- reparented). --, therefor.

In column 16, line 52, in Claim 4, delete "reset" and insert -- reset, --, therefor.

In column 18, line 7, in Claim 9, delete "sending," and insert -- sending, in --, therefor.

In column 18, line 17, in Claim 11, delete "reset" and insert -- reset, --, therefor.

In column 20, line 16, in Claim 17, delete "reset" and insert -- reset, --, therefor.

Signed and Sealed this
Fifth Day of February, 2013

Teresa Stanek Rea
*Acting Director of the United States Patent and Trademark Office*